United States Patent
Danno et al.

US 6,571,247 B1
May 27, 2003

(54) OBJECT ORIENTED TECHNOLOGY ANALYSIS AND DESIGN SUPPORTING METHOD

(75) Inventors: Hirofumi Danno, Yokohama (JP); Katsuhiko Yuura, Kodaira (JP); Fumihiko Iwabuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/432,071

(22) Filed: Nov. 2, 1999

(30) Foreign Application Priority Data

Nov. 2, 1998 (JP) .......................... 10-311820

(51) Int. Cl.[7] .............................. G06F 17/30
(52) U.S. Cl. .................. 707/100; 707/103 Z; 705/1
(58) Field of Search ................. 707/201, 100, 707/7, 104.1, 103 R, 103 Y, 103 Z; 705/1–3, 27

(56) References Cited

U.S. PATENT DOCUMENTS

| | | | | |
|---|---|---|---|---|
| 5,630,125 A | * | 5/1997 | Zellweger | 707/103 R |
| 5,721,910 A | * | 2/1998 | Unger et al. | 707/100 |
| 5,826,263 A | * | 10/1998 | Nakabayashi et al. | 707/7 |
| 6,014,639 A | * | 1/2000 | Fohn et al. | 705/27 |
| 6,212,530 B1 | * | 4/2001 | Kadlec | 707/201 |

* cited by examiner

Primary Examiner—John Breene
Assistant Examiner—Cheryl Lewis
(74) Attorney, Agent, or Firm—Antonelli, Terry, Stout & Kraus, LLP

(57) ABSTRACT

In an object-oriented technology analysis and design supporting method when analysis and design is being performed according to object-oriented technology on a system for business, a person knowledgeable of the business can generate object design information with minimal variation in quality even if the person is not knowledgeable of object-oriented technology.

In the method, an object design information generator 0104 receives: management resource construction information in which resources that should be managed in business are entered hierarchically as elements, business activity construction information in which business activity to be performed in business are entered hierarchically as elements, and a business action scenario, in which is entered, for each element position at the lowermost level in the business activity construction information, the arrangement of operations needed for carrying out the corresponding business activity. The elements in the management resource construction information and the business activity construction information are treated as objects. Class information having the element name are associated with each element, and method information indicating the behavior of the object is obtained from the business action scenario. The elements positioned hierarchically above and below the element are obtained as the relations class information.

10 Claims, 22 Drawing Sheets

FIG.4

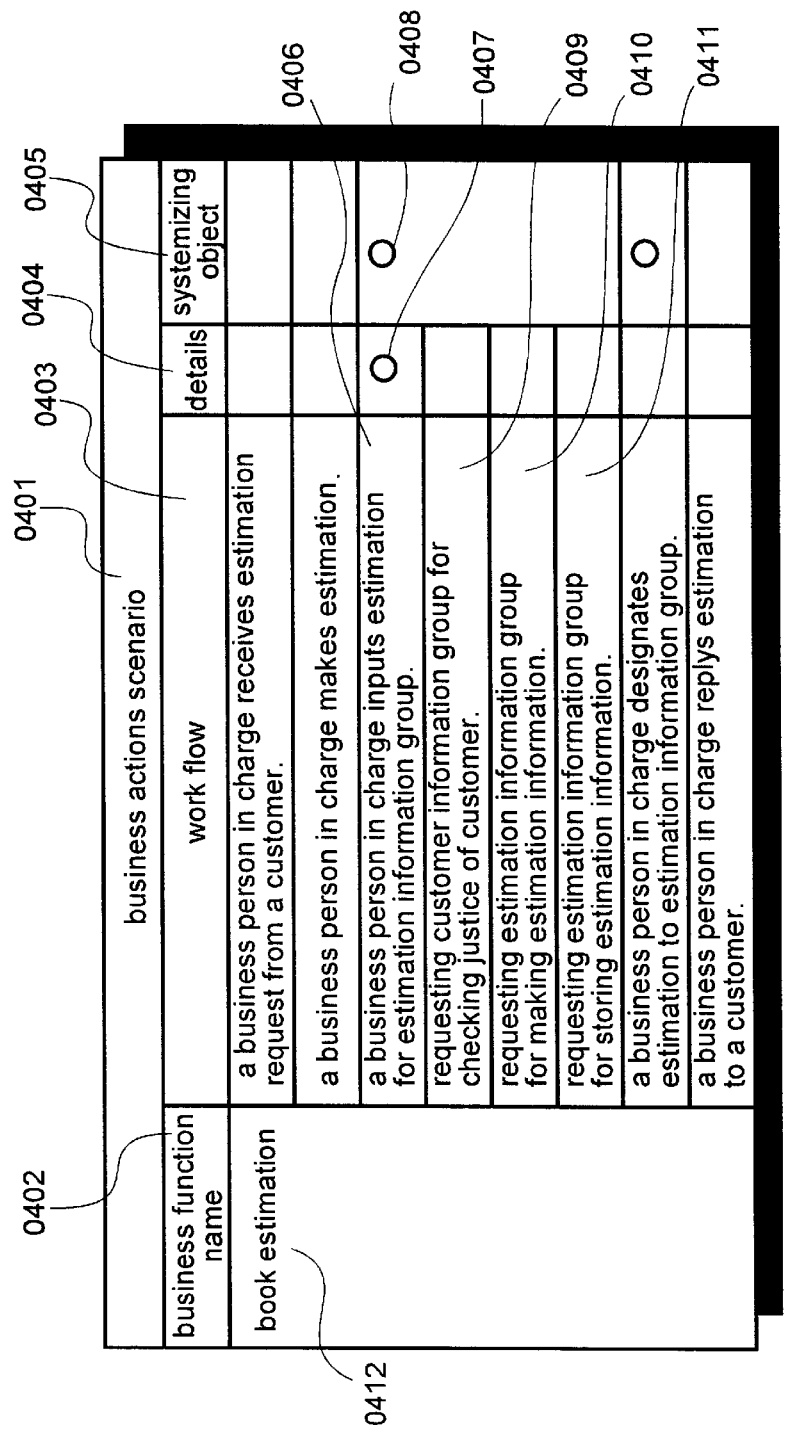

| business function name | business actions scenario | | |
|---|---|---|---|
| | work flow | details | systemizing object |
| book estimation | a business person in charge receives estimation request from a customer. | | |
| | a business person in charge makes estimation. | | |
| | a business person in charge inputs estimation for estimation information group. | ○ | ○ |
| | requesting customer information group for checking justice of customer. | | |
| | requesting estimation information group for making estimation information. | | |
| | requesting estimation information group for storing estimation information. | | |
| | a business person in charge designates estimation to estimation information group. | | ○ |
| | a business person in charge replys estimation to a customer. | | |

FIG.13

| business function name | work flow | business actions scenario ||||| detaies | system use | reuse |
|---|---|---|---|---|---|---|---|---|
| | | who | whom | send | receive | | | |
| book estimation | estimate request receiving | a customer | a business person in charge | estimate request information | | | | |
| | estimate making | a business person in charge | | estimate request information | estimate information | | | |
| | stock check | a business person in charge | stock information group | estimate information | stock existence | | ○ | |
| | estimation input | a business person in charge | estimate information group | estimate information | | ○ | ○ | |
| | customer check | book estimation | customer information group | customer code | customer existence | | | |
| | estimate generate | book estimation | estimate information group | estimate data | estimate information | | | |
| | estimate registration | book estimation | estimate information group | estimate information | | | | |
| | estimate output | a business person in charge | estimate information group | | estimate | | ○ | |
| | estimate answer | a business person in charge | a customer | estimate | | | | |

| objects desingn information | | | |
|---|---|---|---|
| 1704 class name | | a periodical | |
| 1705 data attribute name | | ↑ goods code<br>↑ goods name<br>a publisher | 1701 |
| 1706 method name | | | |
| 1707 relational classes name | generalization classes name | printed matter | |
| 1708 | composition classes name | | |
| 1709 | other classes name | | |

| | | | 1702 |
|---|---|---|---|
| class name | | estimate information group | |
| 1712 data attribute name | | | |
| method name | | estimate information:estimate generator (estimate data)<br>estimate registration (estimate information)<br>estimate:estimate system () | |
| 1710 relational classes name | generalization classes name | sales information | |
| | composition classes name | estimate request information<br>estimate information | |
| | other classes name | | |

| | | | |
|---|---|---|---|
| class name | | book estimation | |
| data attribute name | | state | |
| 1713 method name | | stock existence:stock check<br>(estimate information)<br>estimate input (estimate information)<br>requesting customer information group for checking justice of customer.<br>requesting estimation information group for making estimation information.<br>requesting estimation information group for storing estimation information. | |
| 1711 | | estimate : estimate output() | |
| 1703 relational classes name | generalization classes name | estimation | |
| | composition classes name | | |
| | other classes name | stock information group<br>estimate information group | |

OBJECT ORIENTED TECHNOLOGY ANALYSIS AND DESIGN SUPPORTING METHOD

BACKGROUND OF THE INVENTION

The present invention relates to a technique for improving software productivity. More specifically, the present invention relates to a technique for supporting object-oriented analysis and design to be used in object-oriented software development.

In software development based on object-oriented technology, software architecture is designed by defining classes abstracted from objects in a system and the relations between these classes. A more detailed description is provided in J. Rumbaugh et al, "Object-Oriented Modeling and Design", Prentice Hall, 1991. Also, I. Jacobson, "Object-Oriented Software Engineering: A Use Case Driven Approach", Addison-Wesley, 1992, and G. Booch et al, "UML (Unified Modeling Language Semantics and Notation Guide 1.0)", Rational Software, 1997 describes how a system can be analyzed from the outside.

In these publications, the term "Use Case" is used to refer to a natural language provided by an actor in a system, where the natural language represents how the system being designed is to be used, i.e., a description of how the system is to be used as seen from outside the system. The methodologies involved serve to clearly define the objects within a system that relate to individual use cases. An example of a tool that provides support for a proposed object analysis and design notation and that assists in object analysis and design is "Rose" from Rational Software, Inc. "Rose" is described in Hans-Erik Eriksson, M. Penker, "UML Toolkit", John Wiley & Sons, 1997.

The manner in which objects are obtained from use cases based on the method presented above will be described. First, actors are specified, functions involved in the system being designed (use cases) are enumerated, and related objects are obtained according to the behavior of each function. For example, FIG. 9 shows a use case diagram and a conceptual diagram of related objects.

As shown in FIG. 9, an actor 0901 requests a function of a use case 0903 from a system 0902. Based on the use case 0903, the behaviors within the system 0902 are considered and an object is derived from this. Objects can be broadly categorized into three types: external interfaces 0904, built around a screen; an entity 0905 allowing information to be saved, mainly in a database; and a controller 0906 for controlling objects. By defining business areas using the notations for these objects, a real-world business can be modeled and formed into an object-oriented design, thus allowing flexible accommodation of real-world changes.

In the conventional technology described above, it is assumed that the deriving of actors, use cases, and the different objects will be performed by a specialist in the target domain. However, it is rare that a specialist in a target domain will be knowledgeable in object-oriented technology. Thus, the functions assigned to the different objects will depend on the experience of the analyst/designer, leading to variations in the quality of the analysis and design.

Furthermore, the tool based on the conventional technology described above is a tool that supports the notation proposed by the methodology and that provides assistance in saving and presenting the results of the analysis and design. However, the tool cannot provide guidelines for analysis and design.

Furthermore, object inheritance, which is a characteristic of object-oriented design, is generally achieved by determining common aspects of objects and deriving higher-level objects. However, since common aspects of objects are determined based on the characteristics and responsibilities of objects, only ambiguous guidelines can be provided. Furthermore, the use case indicated in the conventional technology above is generally expressed as sentences. Extraction of objects from sentences is simply performed by taking the nouns, and, so, without experience, there is no way to know even if the extracted object is correct or incorrect. Furthermore, even with similar use cases, different notations in the sentence prevent the same use case from being reused. Furthermore, the objects resulting from the design operation will have deeply related structures between objects, but no guideline is provided for these structures.

Also, in the conventional technology described above, the focus is on modeling the real world. For this reason, there is no design of the screen flows involved when the system is in operation and an end user is selecting an activity to reach a desired activity. Furthermore, while the design of data models is performed according to a different perspective from the design of objects, the demands in business on data model design are intimately related to object design. However, no guidelines are provided for the relationship between object design and data model design.

In a tool based on the conventional technology described above, the relationship between the information indicated in the use cases and the object design information is very loose. Thus, a change in a use case is not reflected in a change in the object design information, leading to a significant problem in the consistency of the design information.

SUMMARY OF THE INVENTION

The object of the present invention is to provide an object-oriented technology analysis and design supporting method for generating object design information with minimal quality variations due to analysis and design. This is achieved by using elements from management resource construction information and business activity construction information that can be recognized in business as objects, and by assigning object behaviors to appropriate object methods. In other words, the object of the present invention is to provide an object-oriented technology analysis and design supporting method that allows generation of object design information even if a person (in particular, an end user knowledgeable about business would be desirable) is not knowledgeable about object-oriented technology, thereby allowing the gap between the end user and the system developer to be bridged.

In order to achieve the object described above, the object-oriented technology analysis and design supporting method of the present invention uses a computer to provide support for analyzing and designing a system relating to business according to object-oriented technology. The method of the present invention performs the operations described below.

Management resource construction information, in which resources (e.g., people, things, money, technology) to be managed in business are described hierarchically as elements, is input. Business activity construction information, in which business activities (e.g., purchasing, production, sales) to be performed in business are described hierarchically as elements, is input. Furthermore, a business action scenario is input. The business action scenario describes, for each of the elements positioned at the lower-most level in the business activity construction information, the arrangement of operations needed to carry out the corresponding business activity. Then, the elements contained in the management resource construction information and the business activity construction information are treated as objects. For the elements treated as objects, object design information is generated and stored. The object design information includes class information, which is used to group objects, method information, which is used to indicate behavior of objects, and relations class information, which is used to indicate relations with other objects.

Furthermore, in the operation for generating and storing the object design information, the elements in the management resource construction information and the business activity construction information are obtained as class information. For the elements positioned at the lowermost level of the business activity construction information, the corresponding arrangement of operations from the business action scenario are obtained as method information. For the elements in the management resource construction information, the arrangement of operations for which the element is treated as a target is obtained as method information. For the elements in the management resource construction information and the business activity construction information, the elements hierarchically above and below the element is obtained as relational class information.

According to the object-oriented technology analysis and design supporting method provided by the present invention, elements recognizable in business from the management resource construction and the business activity construction are handled as objects. This allows objects to be designed so that they are only dependent on the business, and, based on the arrangement of operations in business activities, the behavior of objects can be assigned to appropriate object methods. As a result, an analyst/designer not knowledgeable about object-oriented technology (in particular, an end user knowledgeable about business would be desirable) can, when performing object-oriented analysis and design, generate object design information that minimizes quality variations, thus improving design quality and improving productivity. Thus, end users knowledgeable about business can generate object design information even if they are not knowledgeable about object-oriented technology. This allows the gap between the end user and the system developer to be bridged.

BRIEF DESCRIPTION OF THE DRAWINGS

FIG. 4 is a diagram which shows an example of business action scenario according to the first embodiment.

FIG. 13 is a diagram which shows an example of a business action scenario according to the second embodiment.

FIG. 17 is a diagram which shows an example of object design information according to the second embodiment.

DESCRIPTION OF THE PREFERRED EMBODIMENTS

The following is a description of the embodiments of the present invention, with reference to the drawings.

First Embodiment

Figure 1:
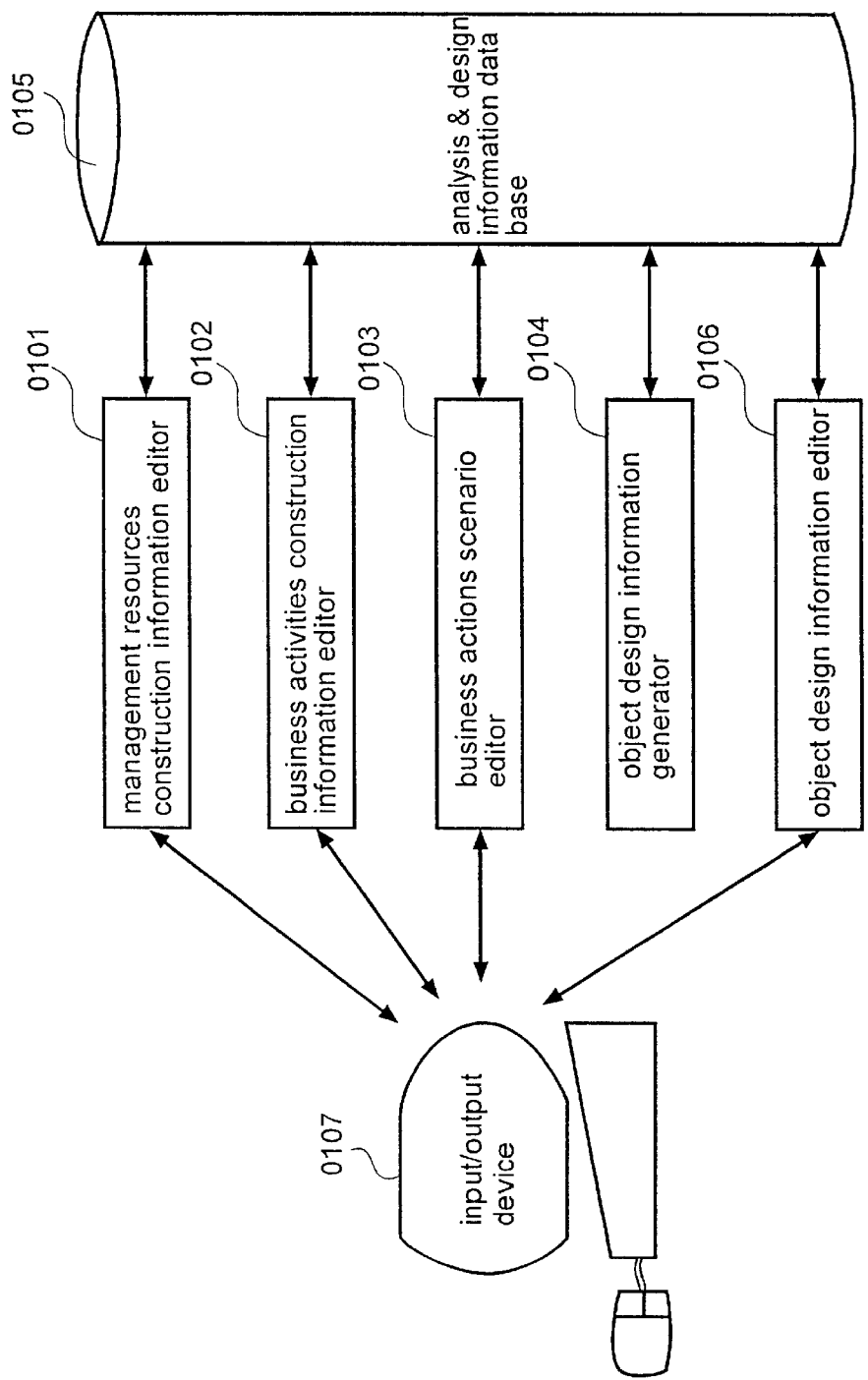
FIG. 1 is a block diagram showing the functional architecture of an object-oriented technology analysis and design supporting method according to a first embodiment.

The following is a description of the first embodiment of the present invention. FIG. 1 is a block diagram showing the functional architecture involved in the object-oriented technology analysis and design supporting method according to the present invention.

The object-oriented technology analysis and design supporting method according to the present invention includes: a management resource construction information editor 0101 for editing management resource construction information; a business activity construction information editor 0102 for editing business activity construction information; a business action scenario editor 0103 for editing business action scenarios; an object design information generator 0104 for generating object design information from business activity construction information and business action scenarios; and an object design information editor 0106 for editing object design information. The present invention also uses an input/output device 0107 and an analysis and design information database 0105 for saving management resource construction information, business activity construction information, business action scenarios, and object design information.

The management resource construction information editor 0101, the business activity construction information editor 0102, the business action scenario editor 0103, the object design information generator 0104, and the object design information editor 0106 are all implemented in software. In other words, in a computer including at least a CPU, a memory, and the input/output device 0107, the CPU executes software installed in the memory to implement the management resource construction information editor 0101, the business activity construction information editor 0102, the business action scenario editor 0103, the object design information generator 0104, and the object design information editor 0106.

Figure 2:
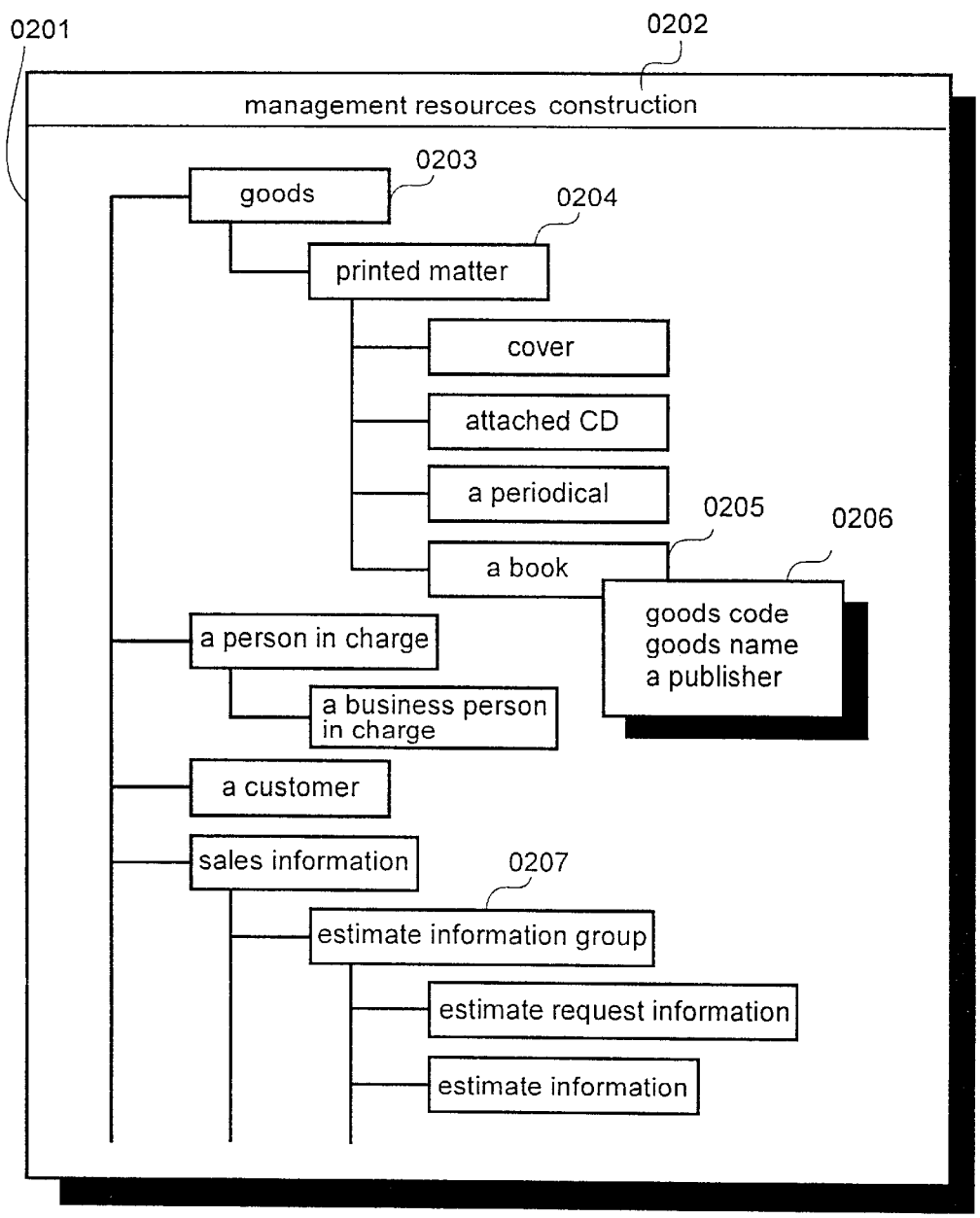
FIG. 2 is a diagram which shows an example of management resource construction information according to the first embodiment.

FIG. 2 shows an example of management resource construction information being edited using the management resource construction information editor 0101 by an analyst/designer for a system relating to a business. When a system relating to a business is to be analyzed and designed according to object-oriented technology, the management resource construction information contains descriptions of resources (e.g., people, things, money, technology) that should be managed for business as well as hierarchical structures for these constructions. The resources that should be managed for business are expressed as constructions formed from resources, organizations, technologies, and the like needed for maintaining the business activities of a firm. The upper levels of the constructions can be set up beforehand to indicate resources that would be used by a standard firm.

The hierarchical structure of management resource construction information can be represented as a tree structure. Resources that are specific instances of a higher-level resource and resources that are constituent elements of a higher-level resource are positioned as lower-level resources associated with higher-level resources. Each resource is an element that makes up the management resource construction information. Also, each resource includes data items for at least an element name and a data structure. In the first embodiment, the element name is used to identify elements within the management resource construction information.

For example, a figure 0201 shown in FIG. 2 indicates an example of management resource construction information displayed in the input/output device 0107. In FIG. 2, a title 0202 is a title that identifies the FIG. 0201 as management resource construction information. In FIG. 2, the element ("product") 0203 indicates the name of an element for a resource that would be included for a standard firm. The element ("printed matter") 0204 indicates an element name for a resource that is a specific instance of the element ("product") 0203 and is information that was entered by the analyst/designer, who operated the input/output device 0107 to place the element ("printed matter") 0204 as a lower-level element below the element ("product") 0203. In this representation of a hierarchical structure, the element names of lower-level elements are displayed to the right of and below the element names of higher-level elements, with solid lines connecting different element names to indicate relations between elements. Similarly, the elements positioned as lower-level elements to the element ("printed matter") 0204 have been entered by the analyst/designer. Furthermore, the analyst/designer can operate the input/output device 0107 to define/display data items within elements. For example, a data item 0206 is a data item for the element ("book") 0205.

Figure 3:
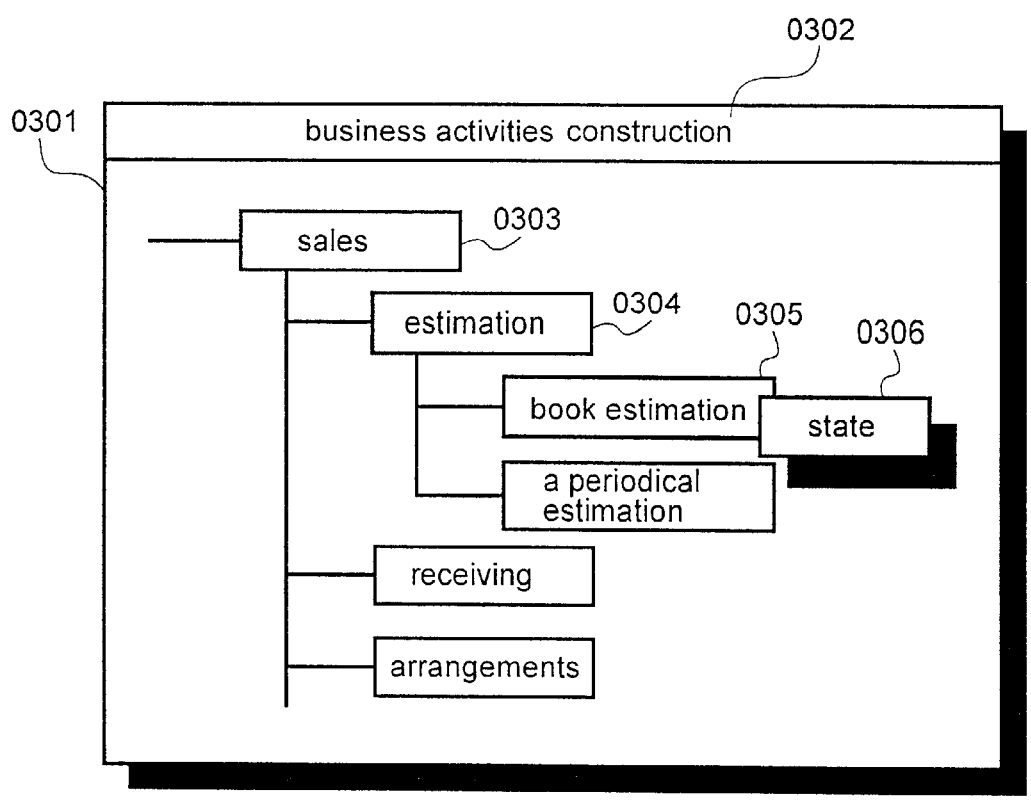
FIG. 3 is a diagram which shows an example of business activity construction information according to the first embodiment.

FIG. 3 shows an example of business activity construction information edited by an analyst/designer using the business activity construction information editor 0102. In a system relating to a business that is analyzed and designed according to object-oriented technology, the business activities construction information consists of information describing business activities (e.g., purchasing, production, sales) that should be performed in business as well as hierarchical structures indicating the construction of this information. The business activities that should be managed are represented in a construction consisting of business functions, business actions, and the like needed for running a business in a firm. The upper levels of the constructions can be set up beforehand to indicate resources that would be used by a standard firm.

The hierarchical structure of the business activity construction information can be represented as a tree structure. Resources that are specific instances of a higher-level resource and resources that are constituent elements of a higher-level resource are positioned as lower-level resources associated with the higher-level resource. Each resource is an element that makes up the management resource construction information. Also, each resource includes data items for at least an element name and a data structure. In the first embodiment, the element name is used to identify elements within the management resource construction information.

For example, a figure 0301 in FIG. 3 shows an example of business activity construction information displayed on the input/output device 0107. In FIG. 3, a title 0302 is a title identifying the figure 0301 as business activity construction information.

In FIG. 3, an element ("sales") 0303 has a name of an element that should be included in any standard firm. An element ("estimate") 0304 is an activity that is part of the element ("sales") 0303 and is an activity that can be considered a standard part of product sales. Since it is a business activity that is not specific to a particular system being designed, it can be set up beforehand based on the business of a firm. The element ("book estimate") 0305 has an element name for a business activity that is a specific instance of the element ("estimate") 0304. The information was entered by an analyst/designer who operated the input/output device 0107 and positioned it at a lower-level from the element ("estimate") 0304. In this representation of a hierarchical structure, the element names of lower-level elements are displayed to the right of and below the element names of higher-level elements, with solid lines connecting different element names to indicate relations between elements.

Furthermore, the analyst/designer can operate the input/output device 0107 and define/display the data items for an element. For example, a data item 0306 is a data item for the element ("book estimate") 0305. Multiple states are possible for the element ("book estimate") 0305 such as "estimate being prepared", "estimate completed", and "estimate being submitted", and this state is indicated in the data item 0306.

FIG. 4 shows an example of a business action scenario that was edited using the business action scenario editor 0103 by an analyst/designer.

The business actions scenario indicates the arrangement of operations required to carry out business activities for individual elements (business activities) in the business activities construction information. The work flow describes the necessary activities including manual activities that are not directly related to the computer system. Each activity is described as a sentence that uses element names from the management resource construction. Also, if an activity is formed from a plurality of detailed activities, category information indicates that detailed activities are present. Information is also provided to distinguish activities that are to be part of the system from purely manual activities. For example, the table in FIG. 4 shows a business action scenario displayed on the input/output device 0107. In FIG. 4, a title 0401 is a title identifying the table as a business action scenario. The columns in the table will be described. A business function column 0402 contains element names from the business activity construction information. Here, the element name for the element ("book estimate") 0305 from FIG. 3 is presented. A work flow column 0403 contains the arrangement of operations needed to perform the business activity indicated by the element name in the business function column 0402. The work flow column 0403 is presented as a sequence of sentences. A details category 0404 indicates (with a circle, in this case) if the corresponding arrangement of operations includes a further detailed arrangement of operations. A systemizing category column 0405 indicates (with a circle, in this case) if the corresponding arrangement of operations is to be part of the system.

In the example shown in FIG. 4, the details category 0407 indicates that detailed arrangements of operations are present, and the systemizing category 0408 indicates that the operation must be specifically designed. An activity 0409, an activity 0410, and an activity 0411 are detailed arrangements of operations for the activity 0406. In this case, the detail levels between activities are indicated by indenting the sentences for the detailed activities by one character.

Figure 5:
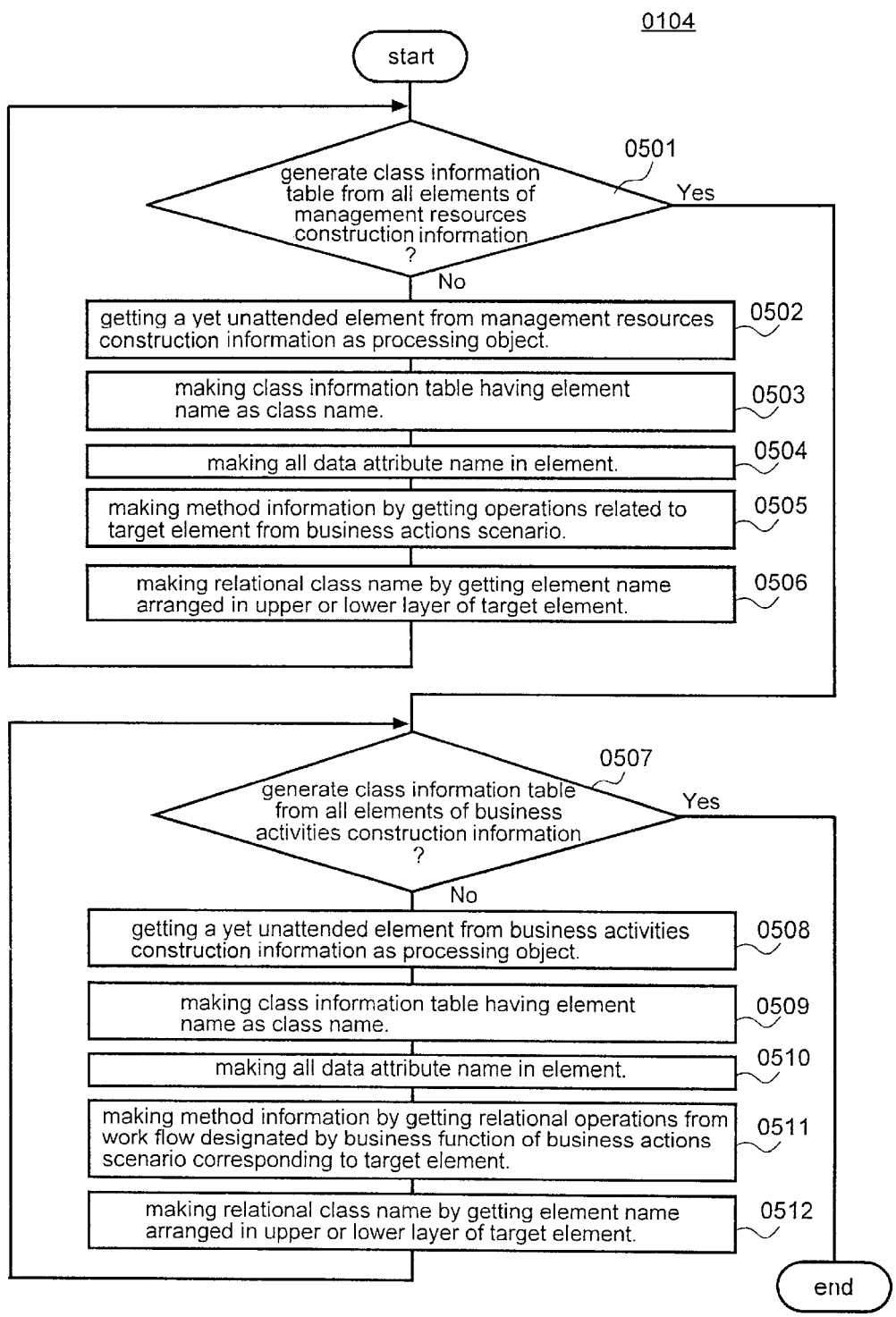
FIG. 5 is a flowchart showing the operations performed by the object design information generator according to the first embodiment when generating object design information.
Figure 8:
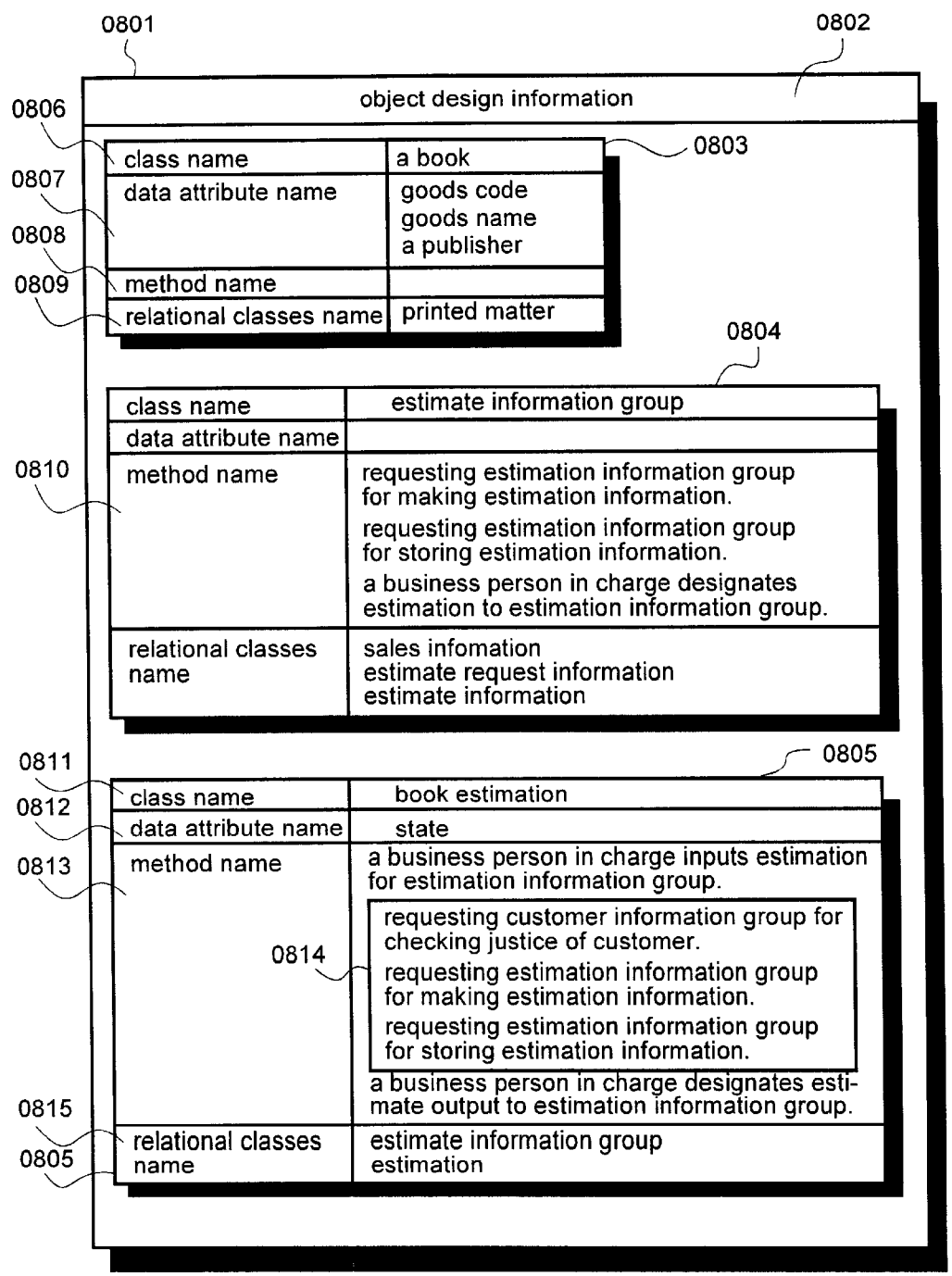
FIG. 8 is a diagram which shows an example of object design information from the first embodiment.
Figure 9:
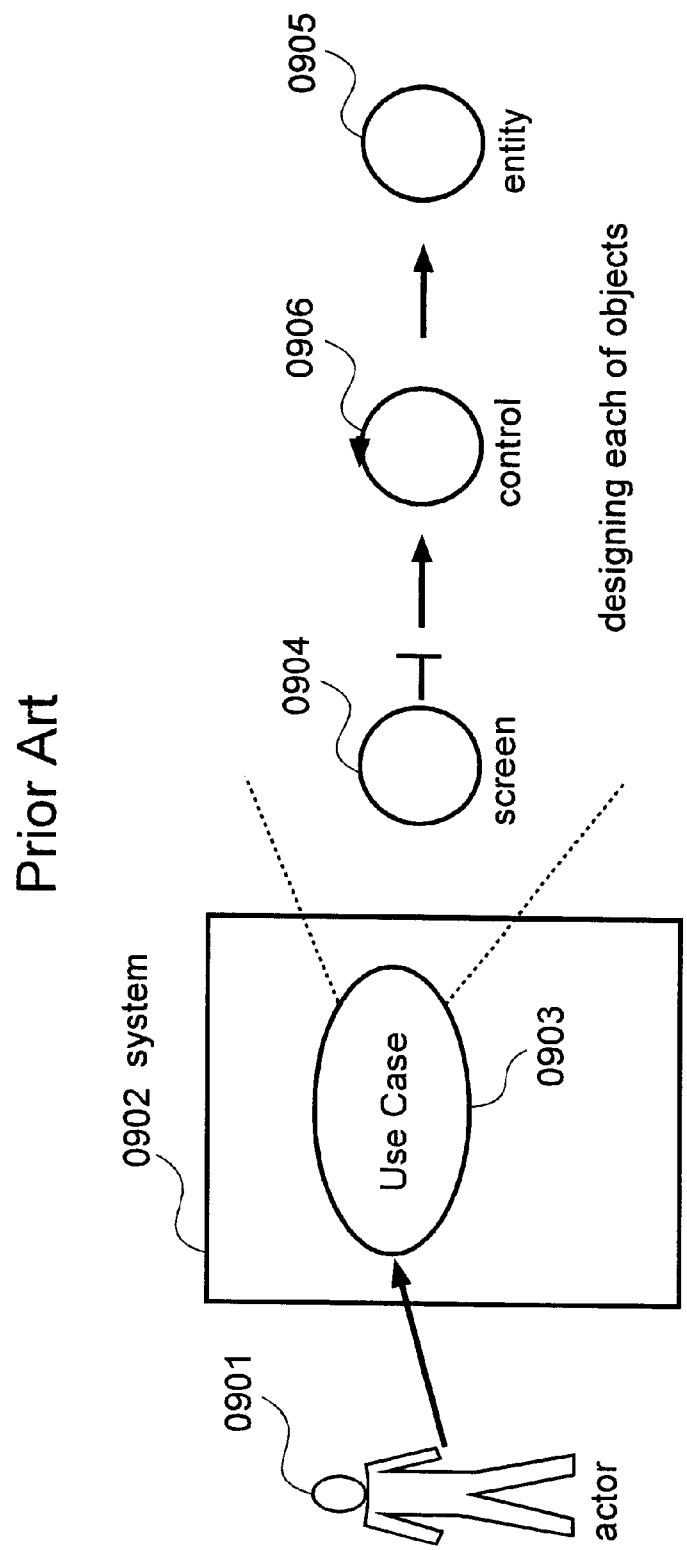
FIG. 9 is a diagram which shows an example of a conventional object-oriented technology analysis and design supporting method.

FIG. 5 is a flowchart showing the operations performed by the object design information generator 0104 when generating object design information. FIG. 8 shows an example of object design information displayed on the input/output device 0107 by the object design information editor 0106.

The object design information is formed from at least one class information, referred to as a specification. The class information includes a class name, data attribute information, method information, and relational class information. In the object design information, the class name is used as an identifier for class information. A figure 0801 in FIG. 8 shows an example of an object design information displayed on the input/output device 0107.

In FIG. 8, a title 0802 is a title identifying the figure 0801 as object design information. Also, in FIG. 8, the class information is displayed as tables 0803, 0804, 0805. The class information 0803 includes a class name 0806, data attribute information 0807, method information 0808, and relational class information 0809.

The following is a description, with reference to FIG. 5, of the operations performed to generate the object design information shown in FIG. 8. These operations consist of a section for generating the object design information from the management resource construction information (step 0501–step 0506) and a section for generating object design information from the business activity construction information (step 0507–step 0512).

First, the section for generating the object design information from the management resource construction information (step 0501–step 0506) will be described. As FIG. 5 shows, the object design information generator 0104 checks to see if class information has been generated for all elements from the management resource construction information (step 0501). If all class information has been generated, the control proceeds to step 0507. If there are unprocessed elements (step 0501), the object design information generator 0104 takes one of the unprocessed elements from the management resource construction information and applies the steps described below (step 0502). More specifically, at step 0502, the object design information generator 0104 finds elements to process by sequentially traversing, from left to right and from top to bottom, the hierarchical relations in the tree structure of the management resource construction information shown in FIG. 2. For the purpose of describing step 0503–step 0506 below, the element ("book") 0205 will be used as the element to be processed.

Next, the object design information generator 0104 sets up the element selected at step 0502 as an object and generates a class information table using the element name of the element as the class name (step 0503). At step 0503, only the class name is entered in the class information table, and all other items are left blank. More specifically, at step 0503 the object design information generator 0104 generates the class information table 0803 shown in FIG. 8 from the element ("book") 0205 shown in FIG. 2 and enters the element name ("book") into the class name 0806.

Next, the object design information generator 0104 copies all data items in the element selected for processing at step 0502 to the data attribute information in the class information table generated at step 0503 (step 0504). More specifically, at step 0504 the object design information generator 0104 copies the data items 0206 shown in FIG. 2 to the data attribute information 0807 shown in FIG. 8.

Next, if the element selected for processing at step 0502 is treated as a target in a business action scenario, the object design information generator 0104 extracts the corresponding business procedure and copies this to the method information in the class information table generated at step 0503 (step 0505). A detailed description of the operations performed at step 0505 will be provided later using a different example. In this example (the element ("book") 0205), there is no corresponding method information.

Next, the object design information generator 0104 extracts other elements positioned hierarchically above and below the element selected for processing at step 0502, and these are added to the relational class information (step 0506). More specifically, at step 0506 the object design information generator 0104 enters the element name ("printed matter") into the relational class information 0809 since the element ("book") 0205 shown in FIG. 2 is associated with the higher-level element ("printed matter") 0204.

Figure 6:
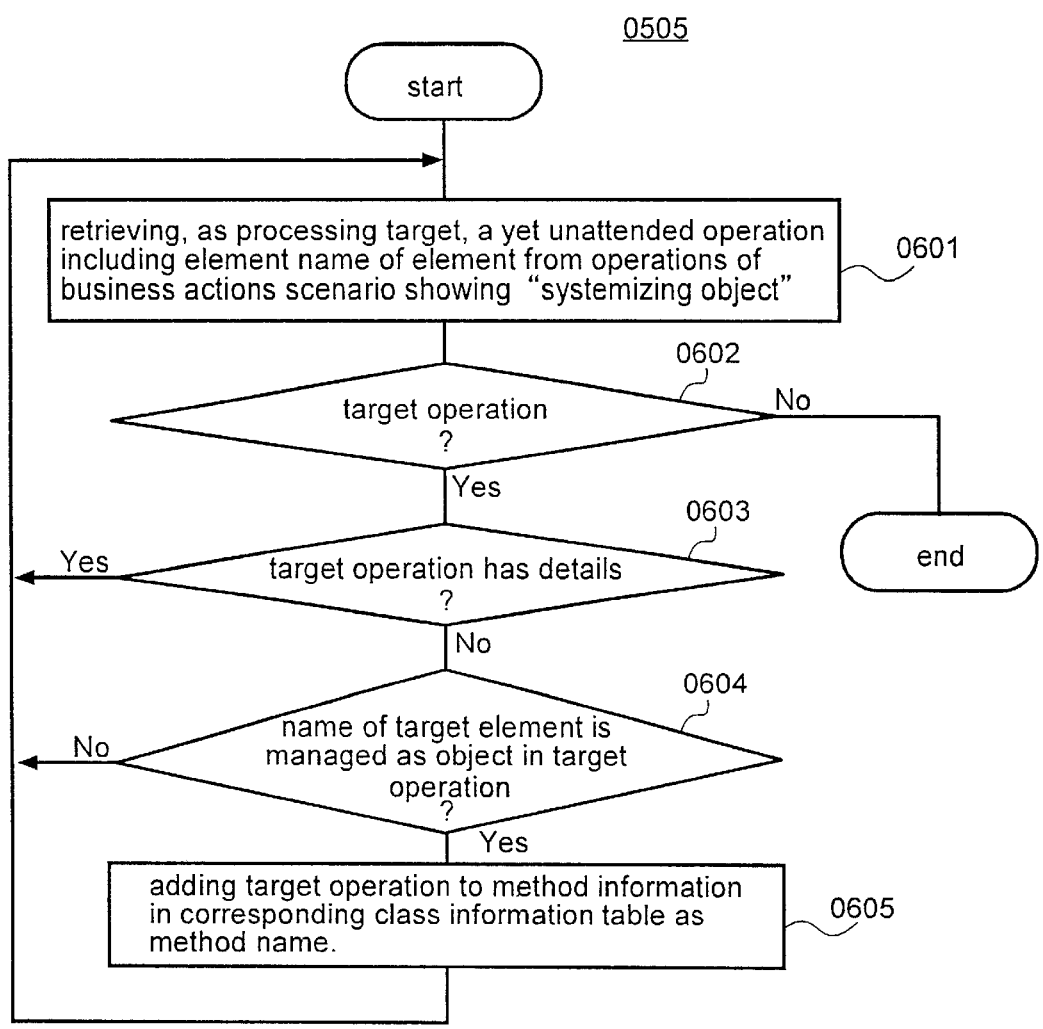
FIG. 6 is a flowchart showing the detailed operations performed at step 0505 in FIG. 5.

The following is a detailed description of the operations performed at step 0505, using as an example an element ("estimate information group") 0207. FIG. 6 is a flowchart showing the detailed operations performed at step 0505 in FIG. 5. The element ("estimate information group") 0207 shown in FIG. 2 corresponds to the class information 0804 from FIG. 8, but when step 0505 is being executed, the method information and the relational class information fields are still empty.

As shown in FIG. 6, the object design information generator 0104 first searches the unprocessed activities from the activity sentences to be systemized in the business action scenario for activities that contain the element name of the element selected for processing at step 0502 (step 0601). More specifically, at step 0601, the object design information generator 0104 selects the activity ("a business person in charge inputs an estimate into the estimate information group") 0406 in the business action scenario shown in FIG. 4 since the activity 0406 is specified for systemizing by the systemizing category 0408 and the element name ("estimate information group") is contained in the sentence of the activity 0406.

Next, if at step 0601 the object design information generator 0104 was unable to find an activity (step 0602), the operations shown in FIG. 6 are exited and control proceeds to step 0506 in FIG. 5. If, at step 0601, the object design information generator 0104 was able to find an activity (step 0602), and if the details category 0407 indicates that the activity includes detailed arrangements of operations (step 0603), then control returns to step 0601 and the unprocessed activities are searched for corresponding activities. In the example shown in FIG. 4, a circle is entered in the details category 0407 for the activity 0406, so control returns to step 0601. When the activity 0410 is found at step 0601 and control reaches step 0603, control can proceed to step 0604.

Next, the object design information generator 0104 checks the sentence in the work flow detected at step 0601 to see if the element name of the element being processed is included as a target (step 0604). If so, control proceeds to step 0605. Otherwise control returns to step 0601. Here, the target refers to the object of the actions in the activity. For example, in the activity ("request estimate information group for generating estimate information") 0410, the element name ("estimate information group") is the target and so control proceeds to step 0605. The evaluation performed at this step can be done by analyzing the sentence contained in the business action scenario.

Next, the object design information generator 0104 uses a method having the work flow detected at step 0601 as the method name and copies this to the method information in the class information table having the class name "estimate information group" (step 0605). More specifically, at step 0605 the object design information generator 0104 uses the sentence for the activity 0410 as a method name and copies this to the method information 0810 in the class information table 0804. In the first embodiment, elements that are treated as targets of activities imply that there are operations that can be performed on these elements even if they are elements in the management resource construction information, so method information is entered for these.

The section for generating object design information from the business activity construction information (step 0507–step 0512) will be described. As shown in FIG. 5, the object design information generator 0104 first checks to see if class information has been generated for all elements in the business activity construction information (step 0507). If so, the operations shown in FIG. 5 are exited. If there are still unprocessed elements (step 0507), the object design information generator 0104 extracts one of the unprocessed elements from the business activity construction information and applies the operations performed in the subsequent steps to the element (step 0508). More specifically, at step 0508 the object design information generator 0104 traverses the hierarchical relations in the tree structure of the business activity construction information shown in FIG. 3 from left to right and from top to bottom, thereby going through each element in sequence. For the purpose of describing the activities in step 0509–step 0512 below, the element ("book estimate") 0305 will be used as the element to be processed.

Next, the object design information generator 0104 sets up the element being processed as a single object at step 0508, and generates a class information table using the element name of the element as the class name (step 0509). At step 0503, only the class name is entered in the class information table, and the other information is left blank. More specifically, at step 0509 the object design information generator 0104 generates the class information table 0805 shown in FIG. 8 from the element ("book estimate") 0305 shown in FIG. 3, and enters the element name ("book estimate") in the class name 0811.

Next, the object design information generator 0104 copies all the data items in the element selected for processing at step 0508 to the data attribute information in the class information table generated at step 0509 (step 0510). More specifically, at step 0510 the object design information generator 0104 copies the data item 0306 shown in FIG. 3 to the data attributes information 0812 shown in FIG. 8.

Figure 7:
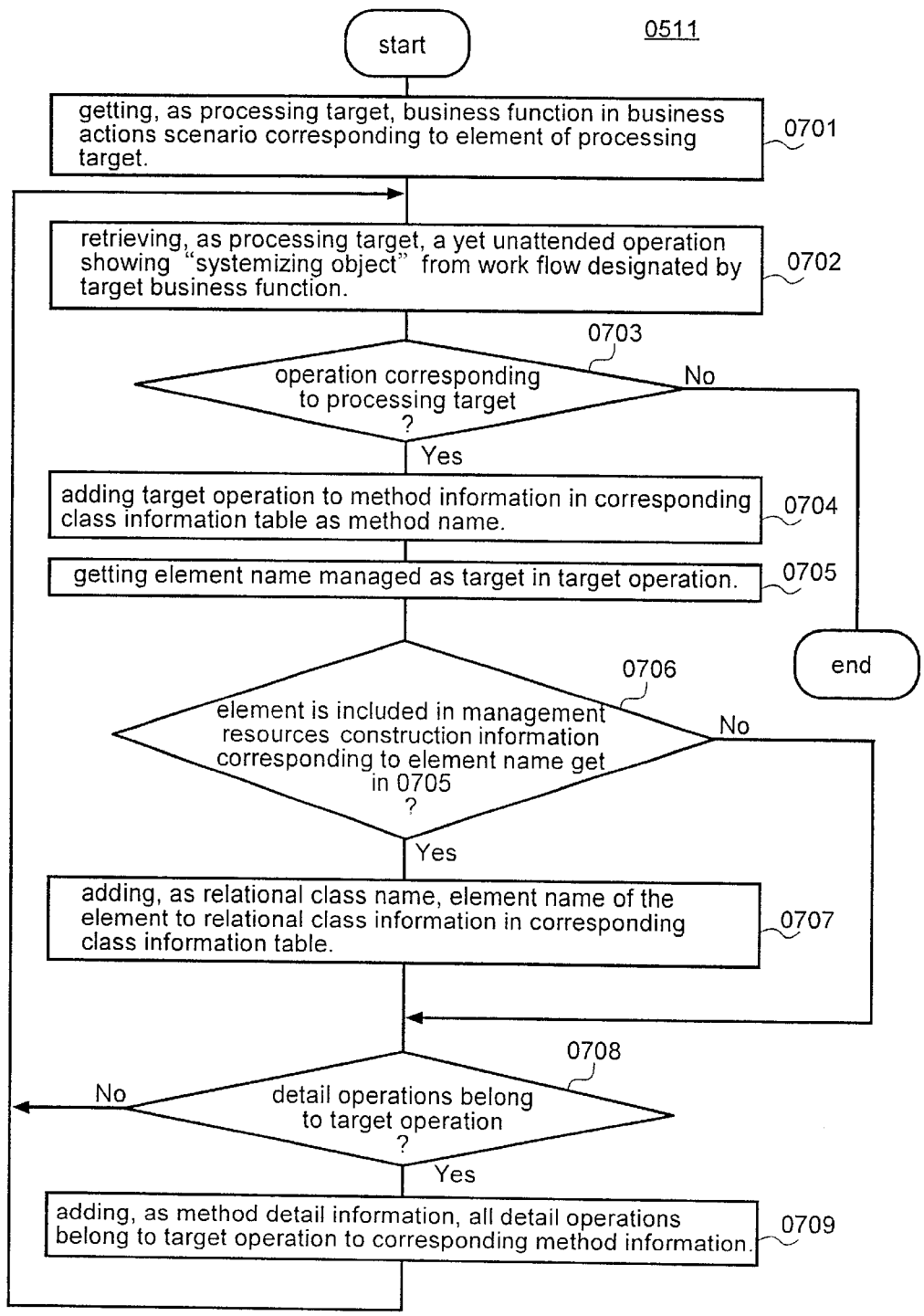
FIG. 7 is a flowchart showing the detailed operations performed at step 0511 in FIG. 5.

Next, the object design information generator 0104 extracts the arrangements of operations in the business action scenario that corresponds to the element selected for processing at step 0508, and this is copied to the method information in the class information table generated at step 0509 (step 0511). The following is a detailed description of the operations performed at step 0511. FIG. 7 is a flowchart showing the detailed operations performed at step 0511 from FIG. 5.

As shown in FIG. 7, the object design information generator 0104 first sets up for processing the business function in the business action scenario corresponding to the element to be processed (step 0701). More specifically, at step 0701 the object design information generator 0104 uses the element ("book estimate") 0305 from FIG. 3 to search for a business function name ("book estimate") 0412 having the same element name ("book estimate") from the business function name column 0402 in the business action scenario shown in FIG. 4.

Next, the object design information generator 0104 searches the business function work flow found at step 0701 for an unprocessed activity that needs to be systemized, and sets this up as the activity to be processed (step 0702). More specifically, at step 0702, the object design information generator 0104 searches for an activity 0406 to be systemized by looking at the systemizing category 0408 in the systemizing category column 0405, and this activity is set up to be processed.

Next, if at step 0702 the object design information generator 0104 was unable to find an activity (step 0703), the operations shown in FIG. 7 are exited and control proceeds to step 0512 shown in FIG. 5. If at step 0702 the object design information generator 0104 was able to find an activity (step 0703), the work flow is set up as a method name and is copied to the method information in the class information table generated at step 0509 in FIG. 5 (step 0704). More specifically, at step 0704 the object design information generator 0104 sets up the sentence for the activity 0406 as the method name and copies this to the method 0813 in the class information table 0805 shown in FIG. 8.

Next, the object design information generator 0104 extracts a candidate element name treated as a target in the sentence of the work flow set up for processing at step 0702 (step 0705). The handling of targets is the same as step 0604 in FIG. 6. For example, since "estimate information group" is included in the activity 0406, "estimate information group" is obtained as a candidate element name.

Next, the object design information generator 0104 searches for an element in the management resource construction information that corresponds to the candidate element name found at step 0605 (step 0706). If found, control proceeds to step 0707. For example, the candidate element name ("estimate information group") can be found in the management resource construction information shown in FIG. 2, so the element 0207 is found.

Next, the object design information generator 0104 uses the element name of the element found at step 0706 as the relational class name and copies this to the relational classes information in the class information table generated at step 0509 of FIG. 5 (step 0707). More specifically, at step 0707 the object design information generator 0104 sets up the element name ("estimate information group") of the element 0207 as the relational class name and copies this to the relational class information 0815 in the class information table 0805 shown in FIG. 8.

Next, if at step 0702 the object design information generator 0104 determines that detailed arrangements of operations are present for the activity set up for processing (step 0708), control proceeds to step 0709. Otherwise, control returns to step 0702. The evaluation of whether or not there are detailed arrangements of operations can be performed by determining if a circle is entered in the details category 0407.

Next, the object design information generator 0104 sets up the detailed arrangement of operations for the activity selected for processing at step 0702 as the method detailed activity, and this is copied to the method information in the class information table generated at step 0509 from FIG. 5 (step 0709). For example, in the activity 0406 shown in FIG. 4, the detailed activities 0409, 0410, 0411 are present, so the flow of these detailed activities 0409, 0410, 0411 is entered into the method information in the class information table 0805 from FIG. 8 as the method detailed activity 0814. The description above presents the detailed operations performed at step 0511 from FIG. 5.

Returning to FIG. 5, the object design information generator 0104 extracts other elements positioned hierarchically above and below the element selected for processing at step 0508 and adds these to the relational class information (step 0512). More specifically, since the element ("book estimate") 0305 shown in FIG. 3 is associated with the higher-level element ("estimate") 0304, the object design information generator 0104 enters the element name ("estimate") into the relational class information 0815 shown in FIG. 8. With operations described above, the project design information shown in FIG. 8 is generated.

As described above, the first embodiment sets up as objects the elements that can be recognized in business from the business resource construction and the business activity construction. This allows design to be performed around objects that are dependent only on business. Since the behavior of the objects can be assigned as methods for appropriate objects, an analyst/designer not knowledgeable with object-oriented technology (in particular, end users who are knowledgeable with business would be desirable) can generate object design information with minimal variations in quality when performing object-oriented analysis and design. This improves design quality and productivity. Thus, an end user who is knowledgeable with business can generate object design information even if the user is not knowledgeable about object-oriented technology. Thus, the gap between the end user and the system developer can be bridged.

Second Embodiment

The following is a description of the second embodiment of the present invention. In the first embodiment described above, there is no mention of "inheritance", which is one of the characteristics of design based on object-oriented technology. Thus, in the second embodiment, guidelines are provided for forming hierarchical structures in the management resource construction information and the business activity construction information. By having object inheritance reflected in the hierarchical structure, in addition to the business categories, an analyst/designer who is not knowledgeable about object-oriented technology can perform analysis and design more easily.

In the first embodiment described above, when targets are obtained from the arrangement of operations in sentences from the business action scenario, it is possible for the results of extraction to be different from what the analyst/designer intended depending on the contents of the sentences. Thus, the second embodiment indicates things that can be easily categorized from the point of view of business such as "what to do", "who", "to whom", "what to give", and "what to receive". This allows analysis and design to be performed easily by an analyst/designer who is not knowledgeable with object-oriented technology.

Furthermore, in order to prevent entry of overlapping work flows for the same business, the second embodiment takes business activities entered once and allows reuse if another business activity consists of a single activity.

From the point of view of overall system design, screen flow design information and database design information are necessary. Thus, the second embodiment also allows the generation of screen flow design information and database design information.

Figure 10:
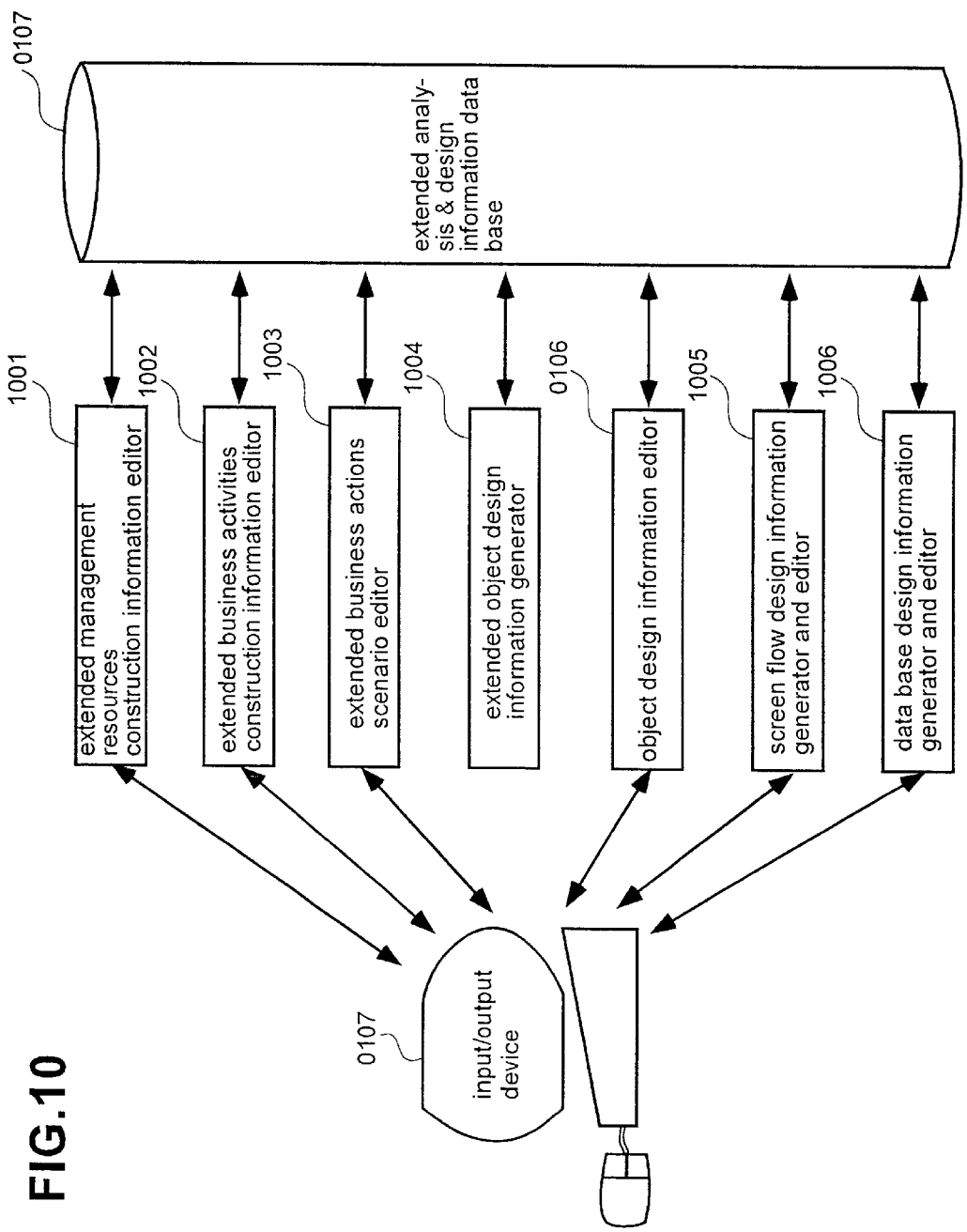
FIG. 10 is a block diagram showing the functional architecture of an object-oriented technology analysis and design supporting method according to a second embodiment.

FIG. 10 is a block diagram showing the functional architecture of the object-oriented technology analysis and design supporting method according to the second embodiment.

The object-oriented technology analysis and design supporting method according to the present invention includes: an extended management resource construction information editor 1001 for editing management resource construction information; an extended business activity construction information editor 1002 for editing business activity construction information; an extended business action scenario editor 1003 for editing business action scenarios; an extended object design information generator 1004 for generating object design information from business activity construction information and business action scenarios; a screen flow design information generating editor 1005 generating/editing screen flow design information from management resource construction information; a database design information generating editor 1006 generating/editing database design information from business activity construction information; and the object design information editor 0106 for editing object design information. This embodiment also uses the input/output device 0107 and an extended analysis and design information database 1007 for storing the business resource construction information, the business activity construction information, the business action scenario, the object design information, the screen flow design information, and the database design information.

The extended management resource construction information editor 1001, the extended business activity construction information editor 1002, the extended business action scenario editor 1003, the extended object design information generator 1004, the screen flow design information generating editor 1005, the database design information generating editor 1006, and the object design information editor 0106 are all implemented in software. In a computer including at least a CPU, a memory, and the input/output device 0107, software installed in the memory is executed by the CPU to implement the extended management resource construction information editor 1001, the extended business activity construction information editor 1002, the extended business action scenario editor 1003, the extended object design information generator 1004, the screen flow design information generating editor 1005, the database design information generating editor 1006, and the object design information editor 0106.

Figure 11:
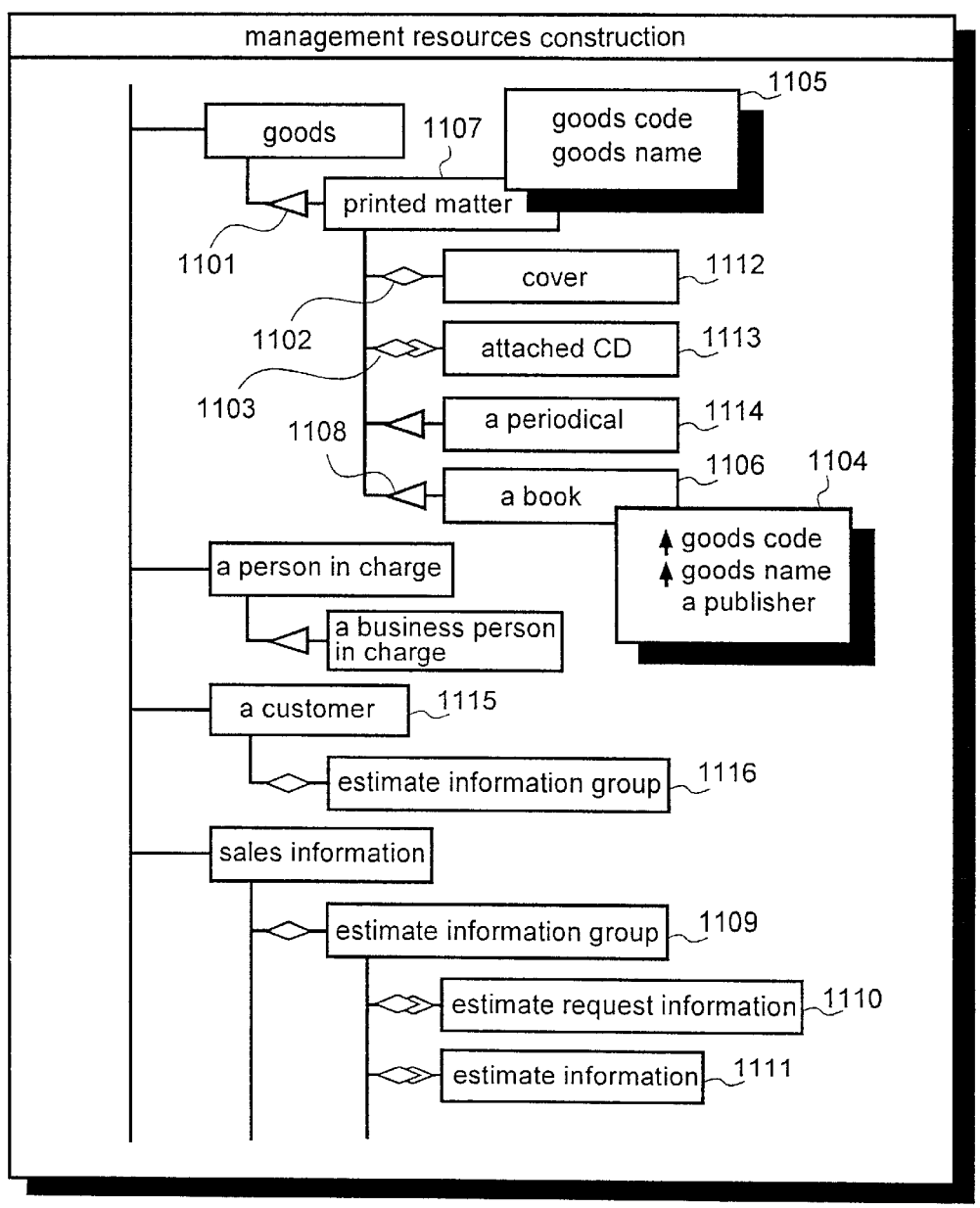
FIG. 11 is a diagram which shows an example of management resource construction information according to the second embodiment.

FIG. 11 shows an example of the management resource construction information edited using the extended management resource construction information editor 1001 by the analyst/designer of the system for a business.

As shown in FIG. 11, the management resource construction information consists of the hierarchical relationship between the elements according to the management resource construction information from the first embodiment described above, with the addition of the hierarchical relationship category information indicating the meaning of the hierarchies. There are two types of hierarchical relationships between resources that must be managed for business, and in practice the analyst/designer implicitly forms hierarchies according to one of the two types. One type is an "is a" relationship that centers on the role involved when the resource is used, and the other type is a "has a" relationship that centers on composition. In the hierarchical relationship category information, the former is categorized as a "role" and the latter is categorized as a "composition". Furthermore, the quantity of lower-level resources categorized as "compositions" is contained in the hierarchical category information as part of the specification. The quantity can be treated from two perspectives, where one indicates the presence of the resource ("always present"/"may not be present"), and the other is the amount of the resource ("single"/"multiple"). The specification of the quantity is based on a combination of two types based on these two perspectives. For example, in FIG. 11, the hierarchical relationship category information 1101 indicates that the hierarchy is categorized as a "role", and that the element ("printed matter") 1107 is one instance of the element ("product"). Similarly, the element ("periodical") 1114 and the element ("book") 1106 are instances of the element ("printed matter") 1107, and are categorized based on the different methods for handling these elements.

In FIG. 11, the hierarchical relationship category information 1102 indicates that the hierarchy is categorized as a "composition", and that the quantity specification is either "always present" or "single". In FIG. 11, the hierarchical relationship category information 1103 indicates that the hierarchy is categorized as "composition" and that the quantity specification is either "may not be present" or "multiple".

The symbols used for the hierarchical relationship category information 1101–1103 are based on a format that is easily recognized by the analyst/designer. In the example shown in FIG. 11, triangles indicate "role", diamonds indicate "composition", solid lines indicate "present", and dotted lines indicate "may not be present". A single symbol indicates "single" and two overlapping symbols indicate "multiple". The analyst/designer is informed of the meanings of these symbols so that these symbols can be combined to express the hierarchical relationship category information.

The data items in elements indicated as "role" are set up so that it can use the data item from the element at the level above it. The analyst/designer need only operate the input/output device 0107 to enter the data items specific to the lower-level element. Since the hierarchical relationship category information is "role", this means that the element is an instance of the element above it, and the data item already entered in the upper-level element can be used for the lower-level element. Thus, by using the data item from the upper-level element as the template for the data item of the lower-level element, the information can be reused. For example, in FIG. 11 the data item 1104 is the data item for the element ("book") 1106, and the "product code" and the "product name" therein are reused from the data item 1105 of the element ("printed matter") 1107 above it. Here, the fact that the information is being reused is indicated by the arrows pointing upward in the data item 1104. However, in this example, the only data item that is actually specific to the element ("book") 1106 is "publisher" and only appears to be reused on the display.

Figure 12:
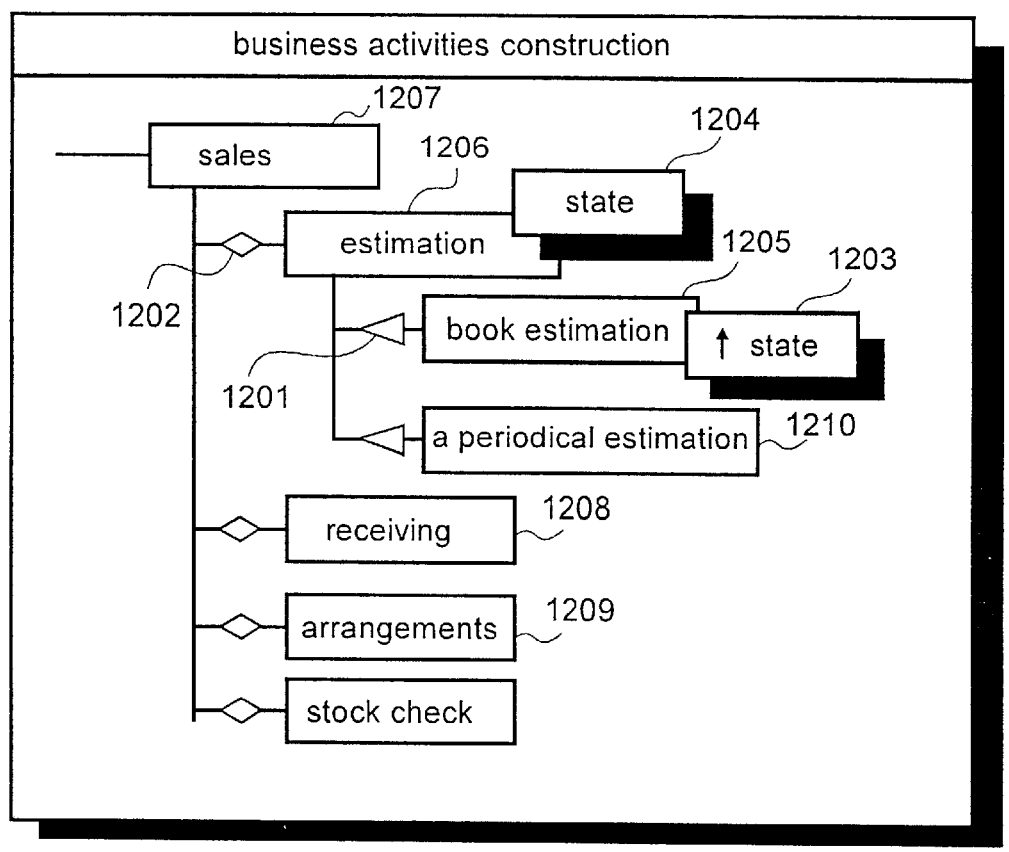
FIG. 12 is a diagram which shows an example of business activity construction information according to the second embodiment.

FIG. 12 shows an example of business activity construction information which has been edited using the extended business activity construction information editor 1002 by an analyst/designer for a system relating to a business. As shown in FIG. 12, the business activity construction information consists of the hierarchical relations between elements from the business activity construction information indicated for the first embodiment described above, with the addition of hierarchical relationship category information indicating the meaning of the hierarchies. As described above for the hierarchical relationships between resources, there are two types of hierarchical relationships between business activities that need to be performed in a business. For example, in FIG. 12, the hierarchical relationship category 1201 indicates that the hierarchy is categorized as "role" and that the element ("book estimate") 1205 is a single instance of the element ("estimate") 1206. Similarly, the element ("periodical estimate") 1210 is an instance of the element ("estimate") 1206. These are categorized based on the different ways involved in handling these elements. In FIG. 12, the hierarchical relationship category information 1202 indicates that the hierarchy is categorized as "composition". Here, the symbols of the hierarchical relationship category information 1201, 1202 mean the same things as those shown in FIG. 11. Also, the hierarchical relationships of the data items in the hierarchical relationship category information shown in FIG. 12 is similar to what was described with reference to FIG. 11.

FIG. 13 shows an example of a business action scenario which has been edited using the extended business action scenario editor 1003 by an analyst/designer. The second embodiment differs from the first embodiment described above in that the analyst/designer enters the business action scenario according to predetermined guidelines, thus allowing the contents of the activities to be clearly defined. As a result, the business action scenario shown in FIG. 13 presents for each action: an action column 1301 in which is entered action contents (work flow) indicating "what to do"; an action source column 1302 in which is entered an action source corresponding to "who"; an activity target column 1303 in which is entered an activity target corresponding to the "who"in "to whom"; an action source information column 1304 in which is entered action source information corresponding to the "what" in "what to give"; and an action results column 1304 in which is entered action result information corresponding to "what to receive". The elements for the management resource construction information relating to an action can thereby be obtained explicitly.

Furthermore, the second embodiment differs from the first embodiment described above in that the analyst/designer can indicate that contents that have been entered once as a business activity can be reused, thus allowing the same contents to be used again. Thus, in the business action scenario, as shown in FIG. 13, there is a reuse category column 1306 for each activity, in which an indication is entered (in this case a circle) if the entered contents for a business activity is to be reused. When the analyst/designer wants to reuse a different business activity, the element name (business function name) of this business activity is entered in the work flow column 1301. For example, in FIG. 13, the analyst/designer enters, according to predetermined guidelines, into the activities column 1301 a noun based on the verb indicating the contents of the activity needed to carry out the business activity entered in the business function name column. The subject of the operation should be entered in the action source column 1302, but the analyst/designer is able to enter, as the subject of the operation, the corresponding element from the management resource construction information that answers the question of "who".

Similarly, for the action destination column 1303, the action source information column 1304, and the action results column 1305, the corresponding elements in the management resource construction information can be entered. More specifically, in the activity 1307, the action source column 1302 is designated "business person in charge", the action destination column 1303 is designated "inventory information group", the action source information column 1304 is designated "estimate information", the action results column 1305 is designated "inventory availability", and the action column 1301 is designated "checking of inventory". From the perspective of the analyst/designer, this can be interpreted as "the 'checking of inventory' activity in which the 'business person in charge' passes on the 'estimate information' to the 'inventory information group' and receives 'inventory availability.'" Also, the reuse category 1308 indicates that contents entered in the business activity for the business function name ("check inventory") are reused in the activity 1307.

Figure 14:
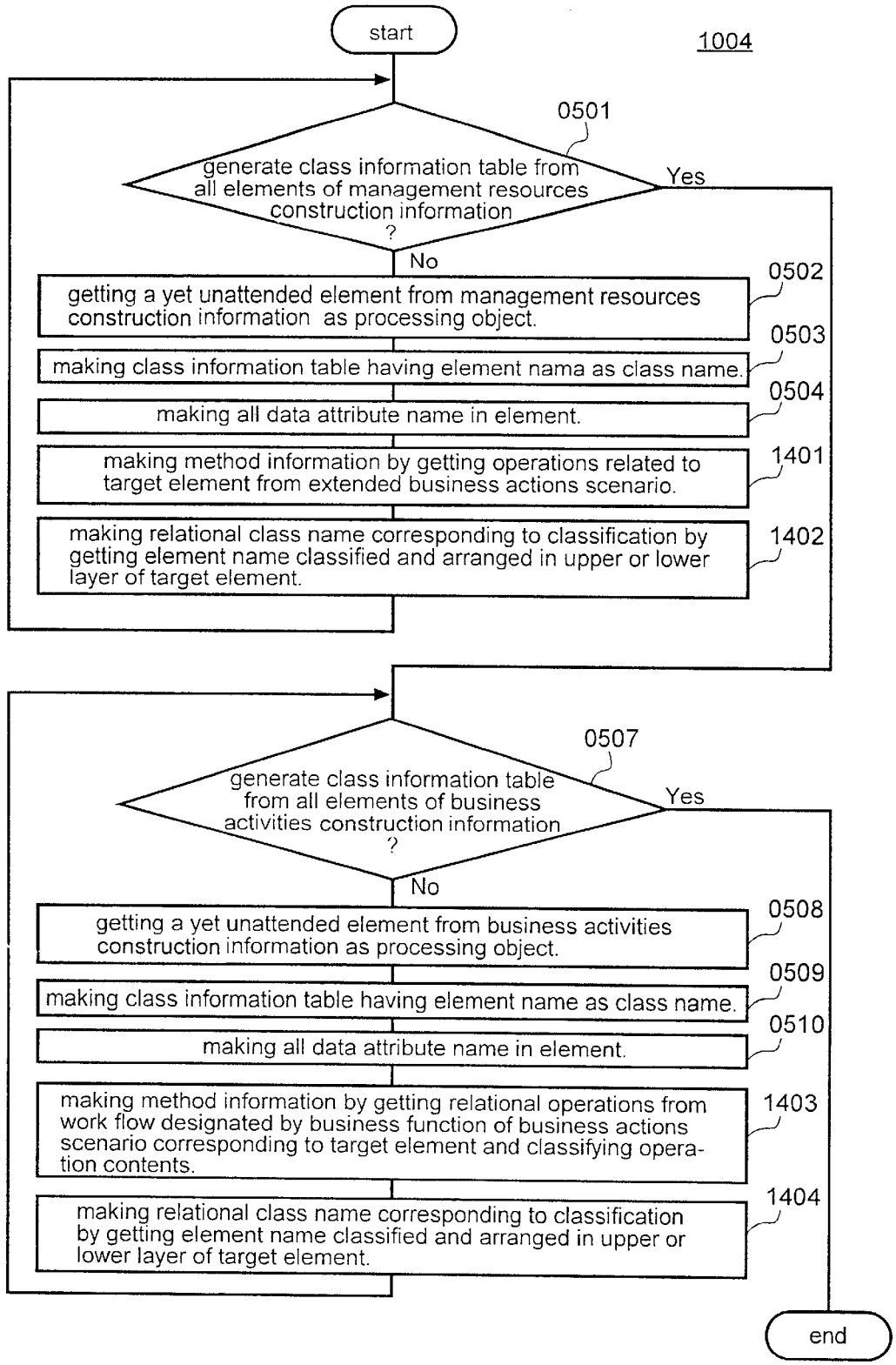
FIG. 14 is a flowchart showing the operations performed when the extended object design information generator from the second embodiment generates object design information.

FIG. 14 is a flowchart showing the operations performed when the extended object design information generator 1004 generates object design information. FIG. 17 shows an example of the object design information displayed on the input/output device 0107 by the object design information editor 0106.

The object design information includes at least one item of specification information, which is referred to as class information. The class information in this embodiment includes: a class name; data attribute information; method information; and relational class information. Furthermore, the relational class information differs from that of the first embodiment described above in that it includes generalized class information, composition class information, and other relational class information.

Instead of the object design information generator 0104 from the first embodiment described above, the second embodiment uses the extended object design information generator 1004. In addition to the features provided by the object design information generator 0104, the extended object design information generator 1004 categorizes the relational class information into generalized class information, composition class information, or other relational class information. For example, in FIG. 17, the class information is displayed as shown in tables 1701, 1702, 1703. The class information 1701 includes: a class name 1704, data attribute information 1705, method information 1706, and generalized class information 1707 of the relational class information; composition class information 1708 of the relational class information; and other relational class information 1709 of the relational class information. The data attribute information 1705 is the data attribute information for the class name ("book"), but since "product code" and "product name" use the template from the data attribute information from the class name ("printed matter"), which is a generalized class, this is indicated by an arrow pointing upward.

The following is a description, with reference to FIG. 14, of the operations used to generate the object design information shown in FIG. 17. These operations consist of a section for generating object design information from the management resource construction information (step 0501–step 0504, step 1401, step 1402) and a section for generating object design information from the business activity construction information (step 0507–step 0510, step 1403, step 1404). Step 0501–step 0504 and step 0507–step 0510 are similar to the operations described with reference to FIG. 5 from the first embodiment described above. Step 1401 and step 1403 will be described later with reference to FIG. 15 and FIG. 16. First, step 1402 and step 1404 will be described.

At step 1402 shown in FIG. 14, the extended object design information generator 1004 gets other elements positioned hierarchically above and below the element of the management resource construction information that was selected for processing at step 0502, and these elements are added to the category of relational class information corresponding to the hierarchical relations category information. More specifically, the extended object design information generator 1004 adds the found elements to the composition class information if it is a lower-level element that has a "has a"relationship (i.e., a diamond is used to signify the hierarchical relationship) with the element selected for processing at step 0502. If the element is a lower-level element that has an "is a" relationship (i.e., a triangle is used to signify the hierarchical relationship) with the element selected for processing at step 0502, then the element is added to the generalized class information.

Here, the composition class information is used to indicate that it is formed from other elements, e.g., if this element is deleted, this is reflected in the elements indicated in the composition class information. The generalized class information is used to allow the attribute information of the element indicated here to be inherited by this element. For example, in FIG. 11, the element ("book") 1106 is associated with the element ("printed matter") 1107, which is the element above it. This hierarchical relationship can be determined to be a "role" based on the hierarchical relationship category 1108. Thus, the extended object design information generator 1004 copies the element name ("printed matter") to the generalized class name 1707 in the class information table 1701 shown in FIG. 17.

Also, for example, in FIG. 11, the element ("estimate information group") 1109 is associated with the element ("estimate request information") 1110 and the element ("estimate information") 1111, which are the elements below it. Since both of these hierarchical relationships can be determined to be "compositions", the extended object design information generator 1004 copies the element names ("estimate request information", "estimate information") to the estimate class information 1710 in the class information table 1702 shown in FIG. 17.

In FIG. 14, as with step 1402, the extended object design information generator 1004 extracts, at step 1404, the other elements positioned hierarchically above and below the element in the business activity construction information selected for processing at step 0508, and these elements are added to the category of relational class information that corresponds to the hierarchical relationship category information.

For example, in FIG. 12, the element ("book estimate") 1205 is associated with the element ("estimate") 1206, which is an element above it. In this hierarchical relationship, the hierarchical relationship category 1201 indicates that the relation is that of "role", so the extended object design information generator 1004 copies the element name ("estimate") to the generalized class name 1711 in the class information table 1703 shown in FIG. 17.

Figure 15:
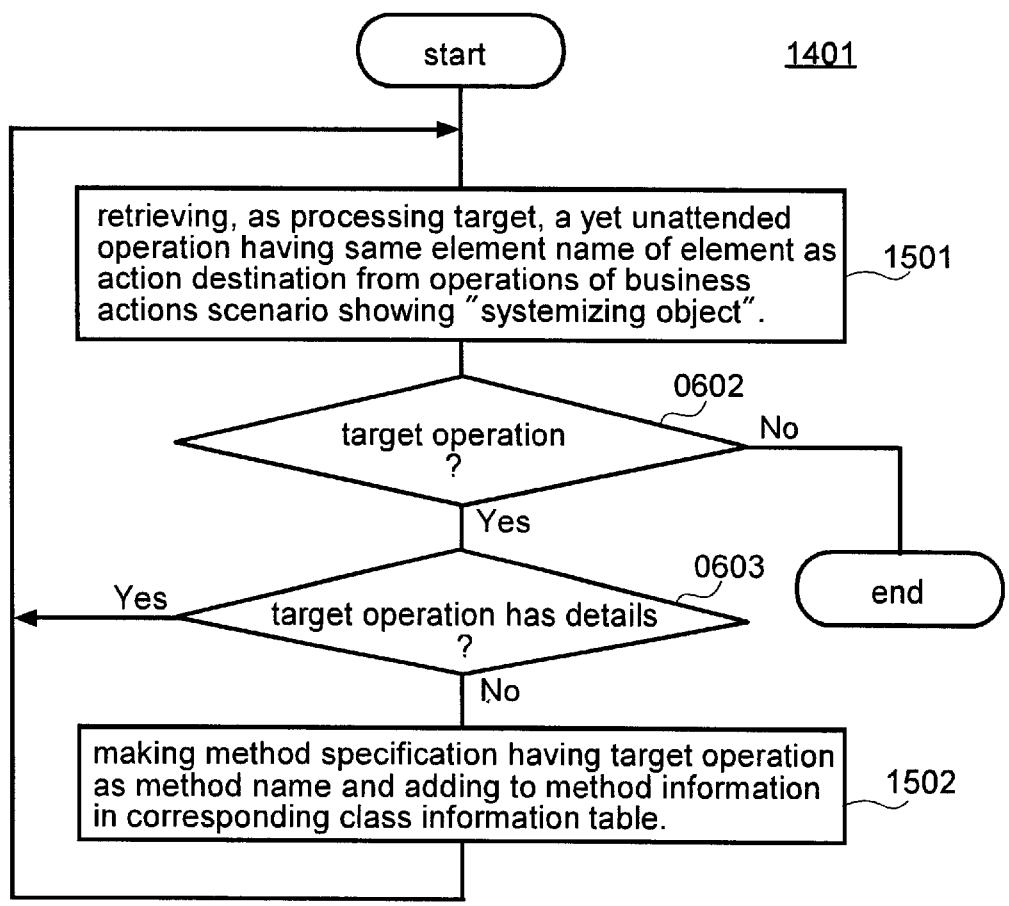
FIG. 15 is a flowchart showing the detailed operations performed at step 1401 in FIG. 14.

The following is a description of step 1401 from FIG. 14. Referring to FIG. 14, if the element selected for processing at step 0502 is treated as a target in the business actions scenario, the extended object design information generator 1004 extracts the corresponding arrangement of operations and copies this to the method information in the class information table generated at step 0503. However, the specific operations that are performed differ slightly from those from step 0505 from FIG. 5. FIG. 15 is a flowchart showing the specific operations performed by step 1401 from FIG. 14. Step 0602 and step 0603 from FIG. 15 are similar to the corresponding operations described with reference to FIG. 6 from the first embodiment presented above.

At step 1501, the extended object design information generator 1004 looks in the business action scenario for an unprocessed systemizable activity for which the activity target column 1303 contains the element name of the element selected for processing at step 0502. More specifically, if the element ("estimate information group") 1109 shown in FIG. 11 is the element to be processed, at step 1501 the extended object design information generator 1004 selects the activity 1309 in the business action scenario shown in FIG. 13 since the activity 1309 is systemizable according to the systemizable category and also because the element name ("estimate information group") is entered in the activity target column 1303.

At step 1502, the extended object design information generator 1004 generates a method specification from the columns for the activity found at step 1501, and this is used as the method name that is then added to the method information in the corresponding class information table. The format for the method specification used here is "action result column: action column (activity target information column)".

More specifically, at step 1502 the extended object design information generator 1004 generates a method specification "estimate information: estimate generation (estimate data)" since, for the activity 1309 in the business action scenario shown in FIG. 13, "estimate generation" is entered in the activity name column 1301, "estimate data" is entered in the activity information column 1304, and "estimate information" is entered in the action results column 1305. The method specification is added to the method information 1712 in the class information table 1702 shown in FIG. 17.

Figure 16:
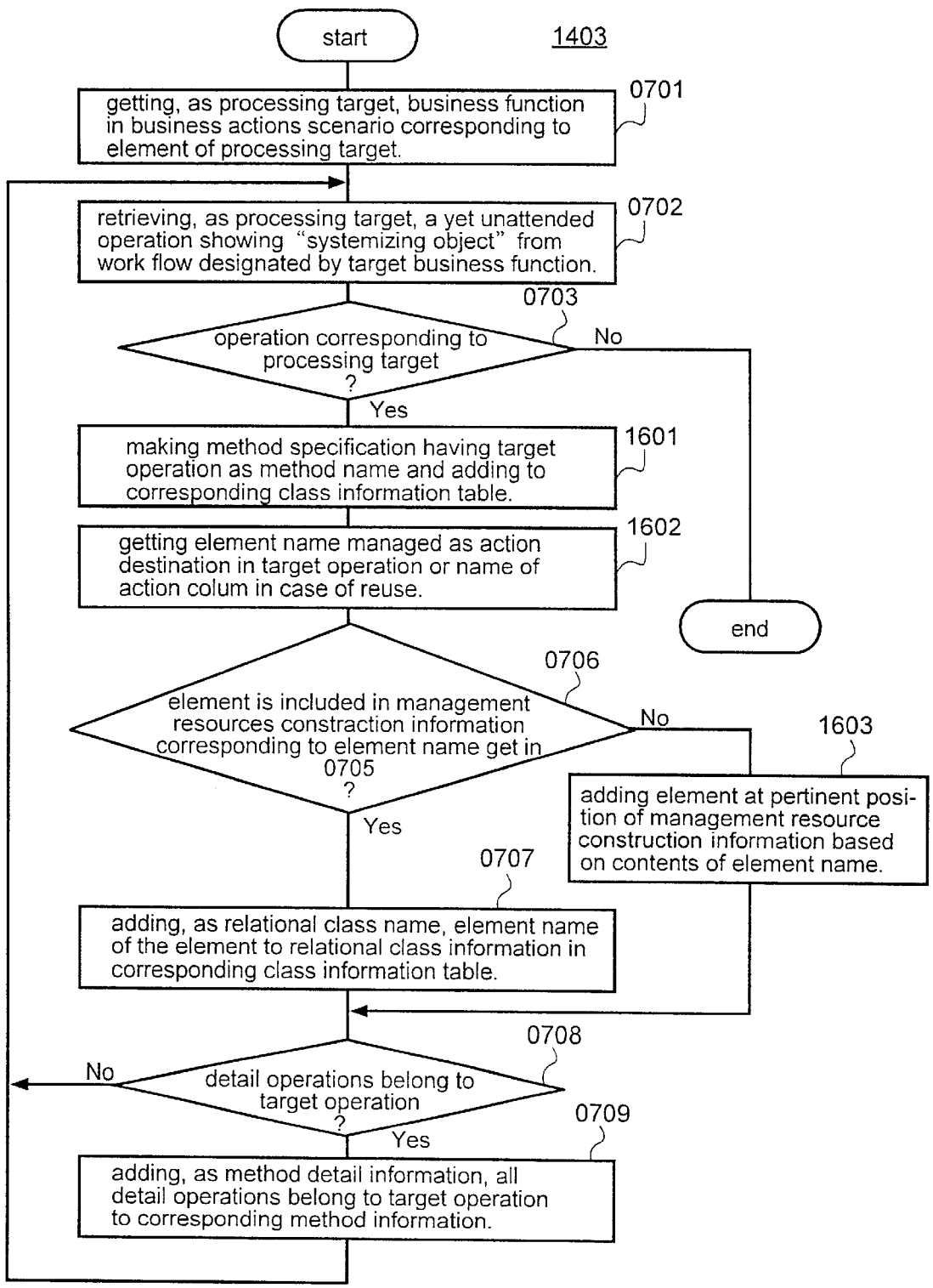
FIG. 16 is a flowchart showing the detailed operations performed at step 1403 in FIG. 14.

Next, step 1403 from FIG. 14 will be described. In FIG. 14, at step 1403, the extended object design information generator 1004 extracts the arrangement of operations in the business actions scenario corresponding to the element selected for processing at step 0508. This is then copied to the method information in the class information table generated at step 0509, but the detailed operations performed here differ somewhat from those performed at step 0511 from FIG. 5. FIG. 16 is a flowchart showing the detailed operations performed in step 1403 from FIG. 14. In FIG. 16, step 0701 step 0703 and step 0706–step 0709 are similar to the corresponding operations shown in FIG. 7 for the first embodiment described above.

At step 1601 the extended object design information generator 1004 generates a method specification for the activity found at step 0702 using the contents entered in the columns corresponding to this activity. This is added to the method information in the corresponding class information table as a method name. Here also, the format of the method specification is similar to what was described above, "action result column: action column (action source information column)".

More specifically, at step 1601 the extended object design information generator 1004 generates the method specification "inventory availability: check inventory (estimate information)" since in the activity 1307 of the business action scenario shown in FIG. 13, "check inventory"is entered in the activity name column 1301, "inventory information" is entered in the activity information column 1304, and "inventory availability" is entered in the action results column 1305. This method specification is added to the method information 1713 in the class information table 1703 shown in FIG. 17.

At step 1602, the extended object design information generator 1004 extracts an element name entered in the activity target column 1303 corresponding to the activity found at step 0702. If the reuse category column 1306 corresponding to the activity found at step 0702 indicates that another business activity is being reused, the extended object design information generator 1004 extracts the element name (business function name) entered in the activities column 1301 corresponding to the activity. More specifically, at step 1602 the extended object design information generator 1004 extracts the element name ("check inventory") entered in the activities column 1301 since a circle is entered in the reuse category column 1306 for the activity 1307 in the business action scenario shown in FIG. 13. Also, for the activity 1310 in the business action scenario shown in FIG. 13, the element name ("estimate information group") entered in the activity target column 1303 is obtained.

At step 1603, based on the contents of the element name obtained at step 0706, the extended object design information generator 1004 obtains the element for the element name and adds it to an appropriate position in the management resource construction information.

There are no rules for element names, but in the data processing column names often use predetermined strings ("information", "information group", and the like) before or after a specific name. Thus, in the second embodiment, if element names that use these predetermined strings are not entered in the management resource construction information but are treated as targets, the elements for the element names are generated and the elements are added at lower levels of the management resource construction information with element names in which the predetermined strings are added to the start or the end. For example, if a predetermined string is " . . . information group", an element having the element name " . . " . would have added below it an element having the element name " . . . information group", with the hierarchical relationship category information set to "composition", "always present", and "single". Also, for example, if a predetermined string is " . . . information", an element having the element name " . . " . would have added below it an element having the element name " . . . information", with the hierarchical relationship category information set to "composition", "not always present", and "multiple". Here, if an element having the element name (" . . . information group") exists under the element having the element name " . . "., then below that would be added an element having the element name " . . . information" with the hierarchical relationship category information set to "composition", "not always present", and "multiple".

More specifically, since the element name ("customer information group") 1312 in the business action scenario shown in FIG. 13 uses the predetermined string " . . . information group", the extended object design information generator 1004 extracts the element name "customer" and searches the management resource construction information shown in FIG. 11. As a result of the search, the element 1115 having the element name "customer" is found, so that an element 1116 having the element name ("customer information group") is added below the element ("customer") 1115 with the hierarchical category information set to "composition", "not always present", and "multiple".

By adding the operations of step 1603 in this manner, the elements that the analyst/designer comes up with during the entry of arrangements of operations can be placed at appropriate positions in the management resource construction information. In other words, by indicating guidelines to the analyst/designer so that predetermined strings are used as described above, the entry of object candidates can be influenced.

Figure 18:
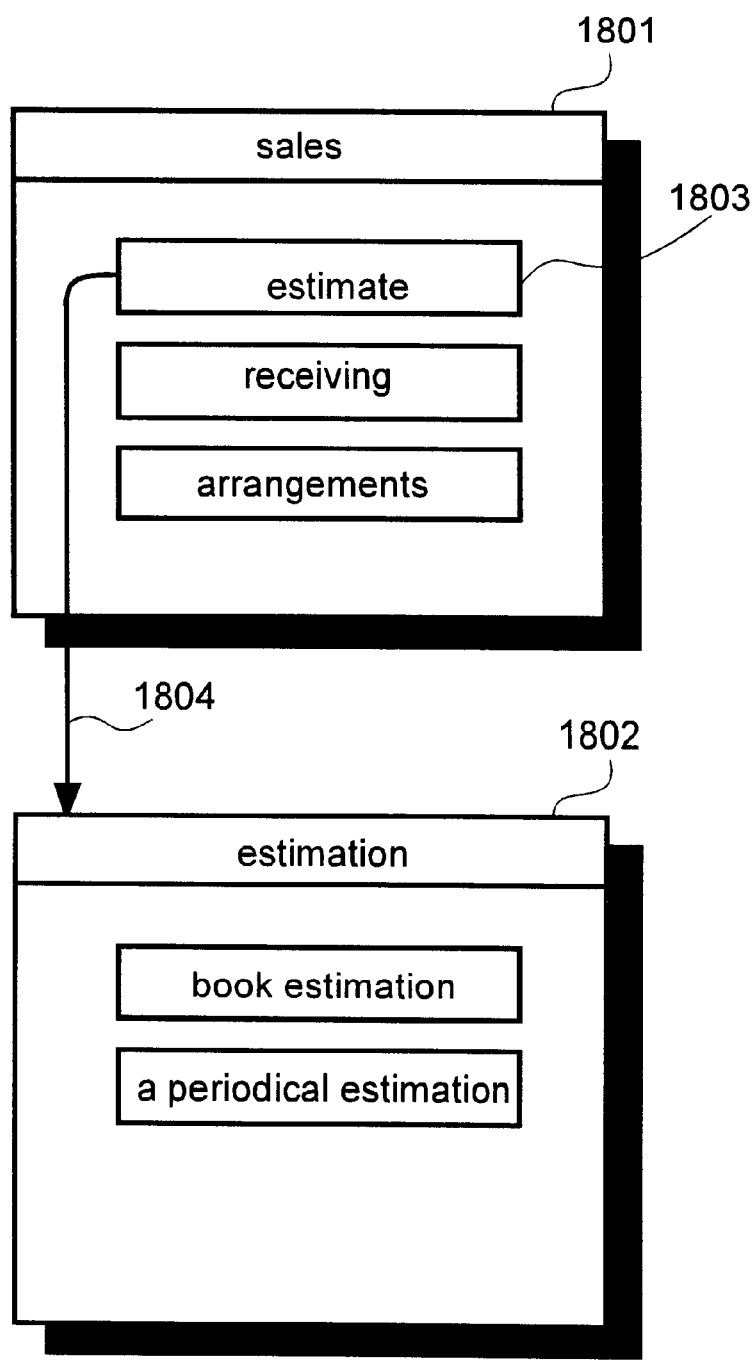
FIG. 18 is a diagram which shows an example of screen flow design information according to the second embodiment.

In the second embodiment, it is also possible to generate screen flow design information and database design information. First, the generation of screen flow design information will be described. FIG. 18 shows an example of screen flow design information as displayed by the screen flow design information generating editor 1005 on the input/output device 0107.

The screen flow design information includes menu screen information and screen flow information. The screen flow design information generating editor 1005, which uses elements to serve as units from which menu screen information is generated, generates menu screen information in which menu items are determined by looking at hierarchical relations between elements in the business activity construction information and finding element names for these elements. If the lower-level elements that are found have in turn other elements below them, a menu screen information for the lower-level elements that are found are also generated along with screen flow information between the different menu screen information. If no other elements are below the lower-level elements that are found, the arrangements for the lower-level elements that are found (business activities) are generated.

For example, in the business activity information shown in FIG. 12, an element ("sales") 1207 has below it an element ("estimate") 1206, an element ("orders") 1208, and an element ("arrangements") 1209. Thus, the screen flow design information generating editor 1005 uses the element ("sales") 1207 as the unit from which menu screen information is generated, and menu screen information 1801 having the screen layout shown in FIG. 18 is generated. More specifically, the screen flow design information generating editor 1005 generates the menu screen information 1801 as shown in FIG. 18, where the title is the element name ("sales") of the element 1207 that serves as the unit from which the menu screen information was generated. The element names ("estimate", "orders", "arrangements") of the lower-level elements 1206, 1207, 1208 are set up as menu items.

Also, for example, the element ("estimate") 1206 in the business activities construction information shown in FIG. 12 has below it the element ("book estimate") 1205 and the element ("periodical estimate") 1210. Similarly, when the element ("estimate") 1206 is used as the unit from which the menu screen information is generated, the screen flow design information generating editor 1005 generates the screen layout shown in the menu screen information 1802 shown in FIG. 18. More specifically, as shown in FIG. 18, the screen flow design information generating editor 1005 displays the element name ("estimate") of the element 1206, which is the unit from which the menu screen information was generated, as the title. The element names ("book estimate", "periodical estimate") of the lower-level elements 1205, 1210 are displayed as menu items on the menu screen information 1802.

The element 1206 is a menu item in the menu screen information 1801 and is also the unit from which the menu screen information 1802 is generated. Thus, the screen flow design information generating editor 1005 generates a screen flow information 1804 so that there is a screen flow from the menu screen information 1801 to the menu screen information 1802.

Figure 19:
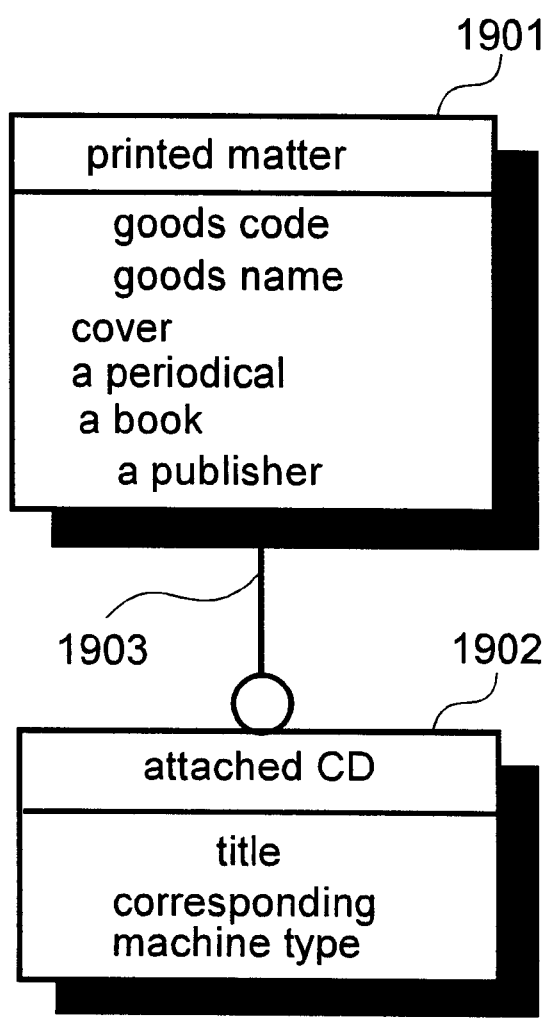
FIG. 19 is a diagram which shows an example of database design information according to the second embodiment.

Next, the generation of database design information will be described. FIG. 19 shows an example of database design information displayed by the database design information generating editor 1006 on the input/output device 0107. The database design information is formed from grouped data tables.

The database design information generating editor 1006 uses an element as the unit from which a data table is generated. The database design information generating editor 1006 looks at the hierarchical relations between elements in the management resource construction information and searches for element names of elements associated via hierarchical category information set to "role" or "composition" and "always present", "single". These are used to generate a data table. Elements associated with other hierarchical category information are assumed to be units for generating other data tables.

For example, in the management resource construction information shown in FIG. 11, the element ("printed matter") 1107 has below it the element ("cover") 1112, the element ("attached CD") 1113, the element ("periodical") 1114, and the element ("book") 1106. Since the hierarchical category information for the elements 1112, 1114, 1106, but not the element 1113, are "role" or "composition" and "always present" and "single", the database design information generating editor 1006 groups together the elements 1112, 1114, 1106 into a group belonging to the element ("printed matter") 1107. The database design information generating editor 1006 treats the element 1113 as a unit from which another data table is to be generated and a data table shown in FIG. 19 is generated in a similar manner. When this is done, the database design information generating editor 1006 will associate the data table 1901 and the data table 1902 as indicated, for example, by a hierarchical structure expression 1903.

The second embodiment as described above provides the following advantages in addition to the advantages of the first embodiment described above:

(1) By providing guidelines for forming hierarchical structures for the management resource construction information and the business activity construction information, business categories can be formed while also having object inheritances reflected in the hierarchical structure. This allows analyst/designers not knowledgeable with object-oriented technology to easily perform analysis and design.

(2) Since business items that are easy to distinguish such as "what to do", "who does", "to whom", "what to give", and "what to receive" are used, analyst/designers not knowledgeable with object-oriented technology can easily perform analysis and design.

(3) Contents that have been entered once as business activities can be reused, thus improving reusability.

(4) Screen flow design information is generated from business activity construction information. This allows the analyst/designer to avoid creating the screen flow design information needed for creating documents and the like.

(5) Since database design information is generated from management resource construction information, the database designer can design databases easily.

Third Embodiment

The following is a description of a third embodiment of the present invention. In the first and the second embodiments described above, once the management resource construction information, the business activity construction information, and the business action scenario are completed, these are used as a basis for generating object design information. In other words, to obtain object design information, the management resource construction information, the business activity construction information, and the business action scenario are necessary, and there is a need to always maintain consistency with the object design information.

However, in practice there are times when an analyst/designer changes the contents of the management resource construction information, the business activity construction information, or the business action scenario, and it is wasteful to generate object design information each time a change is made. Thus, in the third embodiment, when there is a change in the management resource construction information, the business activity construction information, or the business action scenario, the change is reflected in the object design information.

Figure 20:
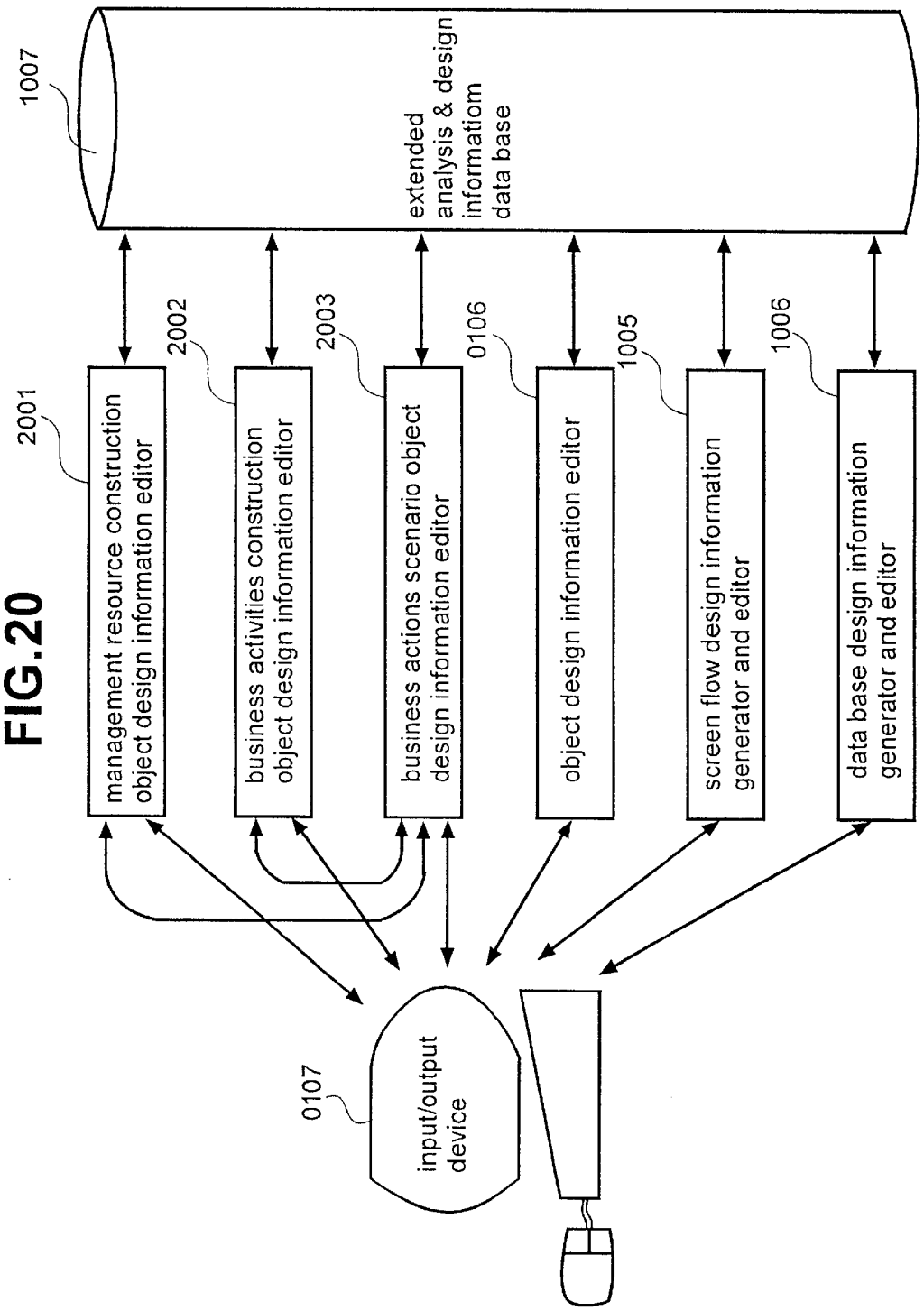
FIG. 20 is a block diagram showing the functional architecture of an object-oriented technology analysis and design supporting method according to a third embodiment.

FIG. 20 is a block diagram showing the functional architecture of an object-oriented technology analysis and design supporting method according to the third embodiment.

The object-oriented technology analysis and design supporting method of the present invention includes: a management resource construction object design information editor 2001 for editing management resource construction information and object design information; a business activity construction object design information editor 2002 for editing business activity construction information and object design information; a business action scenario object design information editor 2003 for indicating changes for the management resource construction object design information editor 2001 and the object design information editor 2002; the screen flow design information generating editor 1005 for generating/editing screen flow design information from management resource construction information; and the database design information generating editor 1006 for generating/editing database design information from business activity construction information. The extended analysis and design information database 1007 shown in FIG. 10 and the input/output device 0107 are also used.

The management resource construction object design information editor 2001, the object design information editor 2002, the business action scenario object design information editor 2003, the screen flow design information generating editor 1005, the database design information generating editor 1006, and the object design information editor 0106 are all implemented through software. In a computer including at least a CPU, a memory, and the input/output device 0107, software installed in memory is executed by the CPU to implement the management resource construction object design information editor 2001, the business activity construction object design information editor 2002, the business action scenario object design information editor 2003, the screen flow design information generating editor 1005, the database design information generating editor 1006, and the object design information editor 0106.

In place of the object design information generator 0104 for generating object design information as shown in FIG. 1 (the extended object design information generator 104 from FIG. 10), the third embodiment uses the editors 2001–2003 to generate/edit the object design information. The issues involved in this are described below.

Figure 21:
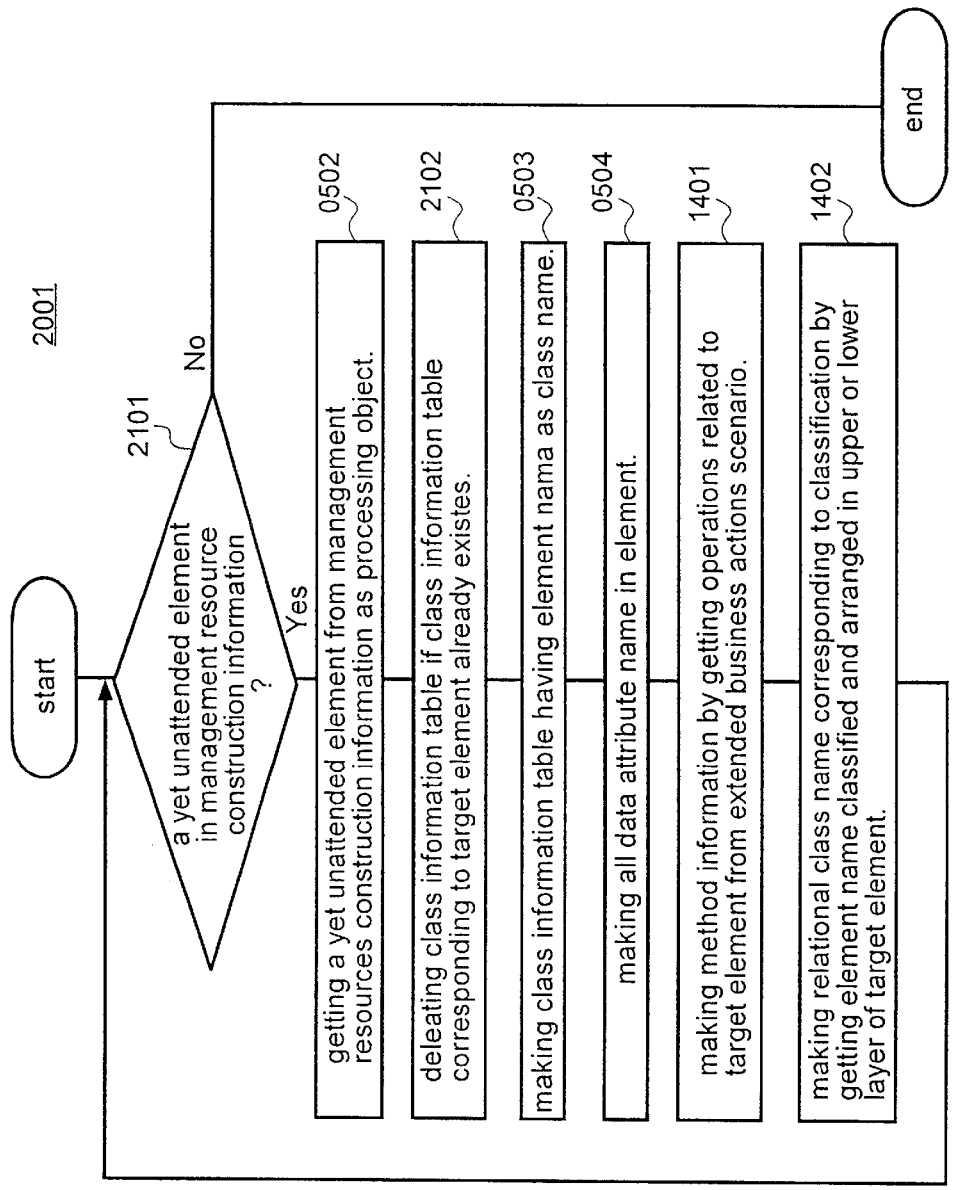
FIG. 21 is a flowchart showing the operations performed when a management resource construction object design information editor edits/generates object design information.

First, the operations involved when the management resource construction object design information editor 2001 generates/edits object design information will be described with reference to the flowchart in FIG. 21. In FIG. 21, the operations are the same as those described with reference to FIG. 14 for the second embodiment described above, except that step 0501 is replaced with step 2101 and step 2102 is added.

At step 2101, the management resource construction object design information editor 2001 checks to see if there are any unprocessed elements in the management resource construction information. If there are no unprocessed elements, this operation is completed. Unprocessed elements are elements that have been edited (newly entered or changed) by an analyst/designer via the input/output device 0107.

At step 2102, if, for the element selected at step 0502, the corresponding class information table has already generated object design information, the management resource construction object design information editor 2001 deletes the class information table. Re-generating by class information table simplifies operations compared to correcting only the modified sections inside class information tables.

Figure 22:
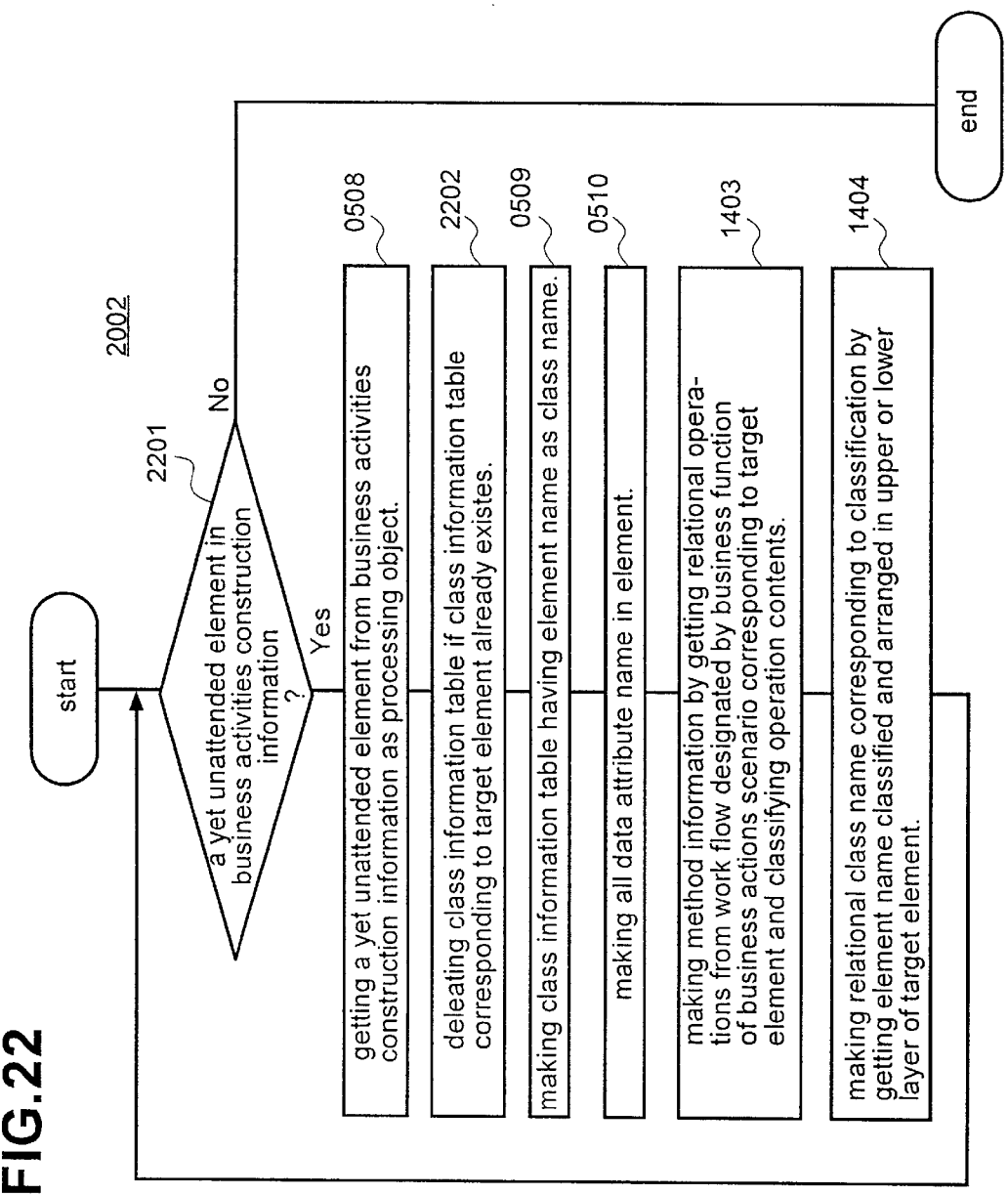
FIG. 22 is a flowchart showing the operations performed when a business activity construction object design information editor edits/generates object design information.

Next, the operations involved when the business activity construction object design information editor 2002 generates/edits object design information will be described with reference to the flowchart in FIG. 22. In FIG. 22, the operations are the same as those of FIG. 14 for the second embodiment described above except that step 0507 is changed to step 2201, and step 2202 is added.

At step 2201, the business activity construction object design information editor 2002 checks to see if there are unprocessed elements in the business activity construction information. If there are no unprocessed elements, this operation stops here. Unprocessed elements are elements that have been edited (newly entered or changed) by an analyst/designer via the input/output device 0107. As with step 2102, if object design information has already been generated, the class information table is deleted at step 2202.

Next, the operations involved when the business action scenario object design information editor 2003 generates/edits object design information will be described. The business action scenario object design information editor 2003 does not actually generate/edit the object design information directly. Instead, when an analyst/designer edits (newly enters or changes) the business action scenario via the input/output device 0107, the element name of the element being edited is sent to the management resource construction object design information editor 2001 and the business activity construction object design information editor 2002 as an unprocessed element, and an instruction is sent to generate/edit the object design information.

As a result, the management resource construction object design information editor 2001 and the business activity construction object design information editor 2002 receiving the notification of the unprocessed element performs the operations shown in FIG. 21 and FIG. 22. Thus, the class information table for the element is generated and changes are reflected in the object design information.

In addition to the advantages of the second embodiment described above, the third embodiment allows object design information to be updated at the same time as changes are made to the management resource construction information, the business activity construction information, or the business action scenario.

As described above, the present invention treats as objects the elements of management resource constructions and business activity constructions that can be recognized in business. Based on the arrangement of operations in the business activities, object behavior is assigned to appropriate object methods. This allows object design information to be generated with minimal quality variations in the analysis and design. Thus, end users knowledgeable with the business can generate object design information even if they are not knowledgeable with object-oriented technology. This closes the gap between end users and system developers.

What is claimed is:

1. An objected-oriented technology analysis and design supporting method using a processing device to support analysis and design of a system relating to business according to object-oriented technology, comprising the steps of:
   a) inputting management resource construction information of resources that need to be managed in business, said management resource construction information being expressed hierarchically as elements;
   b) inputting business activity construction information of business activities needed for business, said business activity construction information being expressed hierarchically as elements;
   c) inputting a business action scenario expressing an arrangement of operations necessary for carrying out business activities corresponding to said elements positioned at a lowermost level in said business activity construction information; and
   d) generating, based on elements of said management resource construction information, elements of said business activity construction information and said business action scenario, object design information including class information for associating said elements contained in said management resource construction information and said elements contained in said business activity construction information to each other, method information generated based on said business action scenario for indicating behavior of an object related to said elements positioned at a lowermost level in said business activity construction information, and relational class information indicating relations between said object and other objects.

2. An object-oriented technology analysis and design supporting method as described in claim 1 wherein said step d) includes the following sub-steps:
   d1) getting, for each element contained in said management resource construction information and said business activity construction information, said element to serve as said class information;
   d2) getting, for each element positioned at said lowermost level in said business activity construction information, an arrangement of operations corresponding to said business action scenario to serve as said method information;
   d3) getting, for each element in said management resource construction information, an arrangement of operations in which said element is treated as a target out of said arrangement of operations in said business action scenario to serve as said method information; and
   d4) getting, for each element contained in said management resource construction information and said business activity construction information, elements positioned hierarchically above and below said element to serve as said relational class information.

3. An object-oriented technology analysis and design supporting method as described in claim 1 wherein:
   said management resource construction information contains an element in which a data item describes a data structure;
   said business activity construction information contains an element in which a data item describes the presence of a plurality of states;
   said step d) including the steps of
      getting, for each element contained in said management resource construction information and said business activity construction information, a data item corresponding to said element to serve as attribute information used to indicate object attributes; and
      adding said attribute information to an object design information for said corresponding element.

4. An object-oriented technology analysis and design supporting method as described in claim 1 wherein said step d) includes the step of adding, out of said elements in said management resource construction information, elements treated as targets in said arrangements of operations in said business action scenario to said relational class information of said business activity corresponding to said arrangement of operations.

5. An object-oriented technology analysis and design supporting method as described in claim 4 wherein:
   said management resource construction information and said business activity construction information contain hierarchical relationship category information indicating if a hierarchical relationship between elements is a "has a" relationship based on a composition, or, if a hierarchical relationship between elements is an "is a" relationship based on a role;
   said step d) including the steps of:
      categorizing an element obtained as said relational class information based on said hierarchical relationship category information;
      categorizing, when categorizing elements obtained as said relational class information, an element into composition class information, which is used to indicate that said element is composed from another element, if said element is a lower-level element in a "has a" relationship;
      categorizing an element into generalization class information, which is used to inherit attribute information to a lower-level element, if said element is a higher-level element in an "is a" relationship; and
      categorizing an element into another class information distinct from said composition class information and said generalization class information if said element is an element treated as a target for an arrangement of operations in said business action scenario.

6. An object-oriented technology analysis and design supporting method as described in claim 5, wherein said business action scenario contains for each operation, at least an item indicating the contents of actions to be performed, an item indicating action source performing said action contents, an item indicating an action target serving as a target for said action content, an item indicating action source information on which said action content is applied, and an item indicating action results resulting from said action contents; and said step d) including the step of generating, for an element in said management resource construction information indicated as said action target, an arrangement of operations for corresponding operations based on contents entered in columns, and obtaining said arrangement of operations to serve as method information for said element.

7. An object-oriented technology analysis and design supporting method as described in claim 6 wherein:

said business action scenario contains, for each operation, an item indicating whether said operation will be reused or not;

said step d) including the step of adding, for an operation indicating reuse, action content of said operation to relational class information of a business activity corresponding to said operation.

8. An object-oriented technology analysis and design supporting method as described in claim 1 wherein:

said management resource construction information and said business activity construction information contain hierarchical relationship category information indicating whether a hierarchical relation between elements is a "has a" relationship based on a composition or an "is a" relationship based on a role;

said step d) including the steps of:

categorizing an element obtained as said relational-class information based on said hierarchical relationship category information;

categorizing, when categorizing elements obtained as said relational class information, said element into composition class information, which is used to indicate that said element is composed from another element, if said element is a lower-level element in a "has a" relationship; and categorizing said element into a generalization class information, which is used to inherit attribute information to a lower-level element, if said element is a higher-level element in an "is a" relationship.

9. An object-oriented technology analysis and design supporting method as described in claim 1 wherein each time any one of said management resource construction information, said business activity construction information, or said business action scenario is updated, object design information is generated and implemented as object design information associated with an updated section.

10. A storage medium capable of being read by a computer in which is stored a program for executing an object-oriented technology analysis and design supporting method to support analysis and design of a system relating to business according to object-oriented technology, said computer program when executed causes said computer to perform the steps of:

a) inputting management resource construction information of a resource to be managed in business, said management resource construction information being entered hierarchically as an element;

b) inputting business activity construction information of a business activity to be performed in business, said business activity construction information being entered hierarchically as an element;

c) inputting a business action scenario in which is entered an arrangement of operations needed for carrying out a business activity corresponding to an element positioned at a lowermost level in said business activity construction information; and d) generating, based on elements of said management resource construction information, elements of said business activity construction information and said business action scenario, object design information including class information for grouping objects, which are elements contained in said management resource construction information and said elements contained in said business activity construction information to each other, method information indicating a behavior of an object obtained from said business action scenario related to said elements positional at a lowermost level in said business activity construction information, and relational class information indicating associations between said object and other objects.

* * * * *